(12) United States Patent
Duan et al.

(10) Patent No.: US 12,550,092 B2
(45) Date of Patent: Feb. 10, 2026

(54) UPLINK AND DOWNLINK BASED BISTATIC AND MULTI-STATIC SENSING

(71) Applicant: QUALCOMM Incorporated, San Diego, CA (US)

(72) Inventors: Weimin Duan, San Diego, CA (US); Hyojin Lee, San Diego, CA (US); Yu Zhang, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 18/338,655

(22) Filed: Jun. 21, 2023

(65) Prior Publication Data

US 2024/0430838 A1 Dec. 26, 2024

(51) Int. Cl.
H04W 56/00 (2009.01)
H04W 24/10 (2009.01)

(52) U.S. Cl.
CPC ....... *H04W 56/0055* (2013.01); *H04W 24/10* (2013.01); *H04W 56/0035* (2013.01)

(58) Field of Classification Search
CPC ............. H04W 56/0055; H04W 24/10; H04W 56/0035; G01S 13/003
See application file for complete search history.

(56) References Cited

U.S. PATENT DOCUMENTS

| 2017/0176583 A1 | 6/2017 | Gulden et al. |
| 2020/0408890 A1 | 12/2020 | Klar et al. |
| 2022/0082653 A1* | 3/2022 | Manolakos ........... G01S 13/003 |
| 2022/0095319 A1 | 3/2022 | Duan et al. |
| 2022/0104111 A1 | 3/2022 | Zorgui et al. |
| 2022/0268912 A1 | 8/2022 | Zhang et al. |
| 2023/0089794 A1* | 3/2023 | Behnamfar ......... H04W 52/367 370/329 |

(Continued)

FOREIGN PATENT DOCUMENTS

WO 2022107050 A1 5/2022

OTHER PUBLICATIONS

Radio Localization and Mapping With Reconfigurable Intelligent Surfaces; by Henk Wymeersch, Jiguang He , BenoÃ® t Denis, Antonio Clemente, and Markku Juntti (Year: 2020).*

(Continued)

*Primary Examiner* — Deepa Belur
(74) *Attorney, Agent, or Firm* — QUALCOMM Incorporated

(57) ABSTRACT

A technique is performed at a user equipment (UE) for supporting one or more radio frequency (RF) sensing measurements. A reflected downlink signal is received, wherein the reflected downlink signal is transmitted as a downlink signal from a base station and reflected off of a target. An uplink signal is transmitted to be reflected off of the target and received by the base station as a reflected uplink signal. A UE receive-transmit (RX-TX) time difference is determined, representing a difference between a time at which the reflected downlink signal is received by the UE and a time at which the uplink signal is transmitted by the UE. A UE measured frequency offset is determined based on reception of the reflected downlink signal, the UE measured frequency offset comprising a Doppler shift component corresponding to a velocity of the target.

20 Claims, 19 Drawing Sheets

(56) References Cited

U.S. PATENT DOCUMENTS

| | | | |
|---|---|---|---|
| 2023/0324532 A1* | 10/2023 | Jeannin | G01S 13/06 |
| | | | 342/36 |
| 2023/0408677 A1* | 12/2023 | Duan | G01S 13/878 |
| 2024/0012086 A1 | 1/2024 | Duan et al. | |
| 2024/0418822 A1* | 12/2024 | Liu | G01S 7/006 |
| 2025/0264570 A1* | 8/2025 | Wang | H04W 4/029 |

OTHER PUBLICATIONS

Wahab A., et al., "A Novel Bistatic-SAR Simulation-Based on Fixed Receiver", 2020 IEEE 23rd International Multitopic Conference (INMIC), Nov. 5-7, 2020, 6 Pages.

Chen Xu, et al., "Downlink and Uplink Cooperative Joint Communication and Sensing", arXiv:2211.04065v1 [cs.IT], arxiv.org, Cornell University Library, 201 Olin Library Cornell University Ithaca, NY 14853, Nov. 8, 2022, pp. 1-14, XP091363792, Sections I, II, Figures 1,3.

International Search Report and Written Opinion—PCT/US2024/026321—ISA/EPO—Aug. 13, 2024.

* cited by examiner

UPLINK AND DOWNLINK BASED BISTATIC AND MULTI-STATIC SENSING

BACKGROUND

1. Field of Disclosure

The present disclosure relates generally to the field of radio frequency (RF) sensing, and more specifically joint operation of wireless communications and RF sensing.

2. Description of Related Art

RF sensing broadly refers to the reception and use of reflected and/or emitted radio frequency (RF) radiation to determine one or more physical characteristics within an environment. Various physical characteristics may be determined, such as an object's range (i.e., distance away from a reference point), direction, position (e.g., relative position with respect to one or more reference point or absolute position within a given three-dimensional space), speed, velocity, etc. Radio detection and ranging (radar) is a type of RF sensing technology that uses the reflection of radio waves (e.g., RF signals) to determine characteristics such as the distance (ranging), angle, and/or radial velocity of one or more objects.

Wireless communication systems typically involve the use of RF signals to communicate data between or among two or more points, without the use of a physical conductor, such as a wire or cable. For example, data can be modulated onto a carrier signal which can be wirelessly propagated over distances from one point to one or more other points. Examples of wireless communications include those that utilize one or more base stations (BS) and user equipment (UE) that communicate with the base station(s). A type of wireless communication system that is widely used is one that that is commonly referred to as a 5th Generation (5G) New Radio (NR) communication system based on a standard defined by the 3rd Generation Partnership Project (3GPP).

Joint communications and sensing (JCAS) has been identified as a potential capability for future wireless communication networks. By employing existing nodes such as base stations (BS) and user equipment (UE), RF sensing can be implemented without adding significant additional costs and take advantage of existing coverage areas already established for wireless communications. However, the inclusion of sensing capabilities in wireless communication networks presents many challenges.

BRIEF SUMMARY

Aspects of the disclosure utilize both an uplink signal and a downlink signal to implement bistatic or multi-static sensing, thereby facilitating cancellation of certain signal components and reducing errors related to effects of oscillator offset and/or UE mobility.

In an aspect of the disclosure, a method is performed at a user equipment (UE) for supporting one or more RF sensing measurements. The method includes, at the UE, receiving a reflected downlink signal, wherein the reflected downlink signal is transmitted as a downlink signal from a base station and reflected off of a target. The method further includes, at the UE, transmitting an uplink signal to be reflected off of the target and received by the base station as a reflected uplink signal. The method further includes, at the UE, reporting a UE receive-transmit (RX-TX) time difference to a sensing server, the UE RX-TX time difference representing a difference between a time at which the reflected downlink signal is received by the UE and a time at which the uplink signal is transmitted by the UE. The method further includes, at the UE, reporting a UE measured frequency offset to the sensing server, the UE measured frequency offset comprising a Doppler shift component corresponding to a velocity of the target. The UE RX-TX time difference and the UE measured frequency offset, along with a base station RX-TX time difference and a base station measured frequency offset, may support computation of a position estimate and a velocity estimate for the target at the sensing server. The sensing server may be implemented as a part the base station. Additionally or alternatively, the sensing server may be implemented in a server apart from the base station.

In another aspect of the disclosure, a method is performed at a base station for supporting one or more RF sensing measurements. The method includes, at base station, transmitting a downlink signal to be reflected off of a target and received by a UE as a reflected downlink signal. The method further includes, at the base station, receiving a reflected uplink signal, wherein the reflected uplink signal is transmitted as an uplink signal from the UE and reflected off of the target. The method further includes, at the base station, reporting a base station RX-TX time difference to a sensing server, the base station RX-TX time difference representing a difference between a time at which the downlink signal is transmitted by the base station and a time at which the reflected uplink signal is received by the base station. The method further includes, at the base station, reporting a base station measured frequency offset to the sensing server, the base station measured frequency offset comprising a Doppler shift component corresponding to a velocity of the target. The base station RX-TX time difference and the base station measured frequency offset, along with a UE RX-TX time difference and a UE measured frequency offset, may support computation of a position estimate and a velocity estimate for the target at the sensing server. Again, the sensing server may be implemented as a part the base station. Additionally or alternatively, the sensing server may be implemented in a server apart from the base station This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
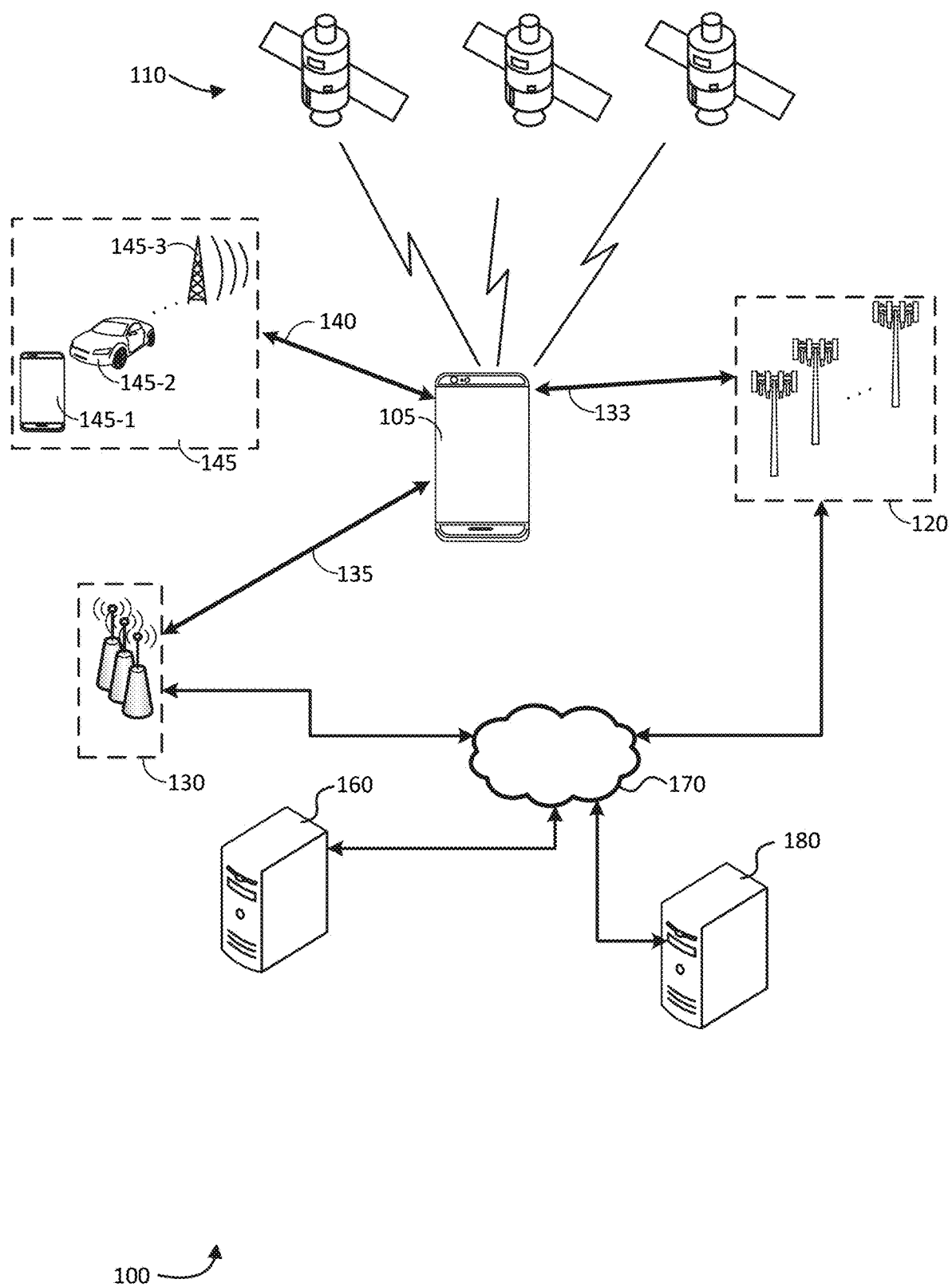
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110$a$, 110$b$, 110$c$, etc. When referring to such an element using only the first number, any instance of the element is to be understood (e.g., element 110 in the previous example would refer to elements 110-1, 110-2, and 110-3 or to elements 110$a$, 110$b$, and 110$c$).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi®) technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may absolute location determination, relative location determination, ranging, or a combination thereof. Such positioning may include and/or be based on timing, angular, phase, or power measurements, or a combination thereof (which may include RF sensing measurements) for the purpose of location or sensing services.

FIG. 1 is a simplified illustration of a positioning system 100 in which a UE 105, location server 160, and/or other components of the positioning system 100 can use the techniques provided herein for [insert title/description, e.g.: determining an estimated location of UE 105], according to an embodiment. The techniques described herein may be implemented by one or more components of the positioning system 100. The positioning system 100 can include: a UE 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and/or Non-Terrestrial Network (NTN) satellites; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (cMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
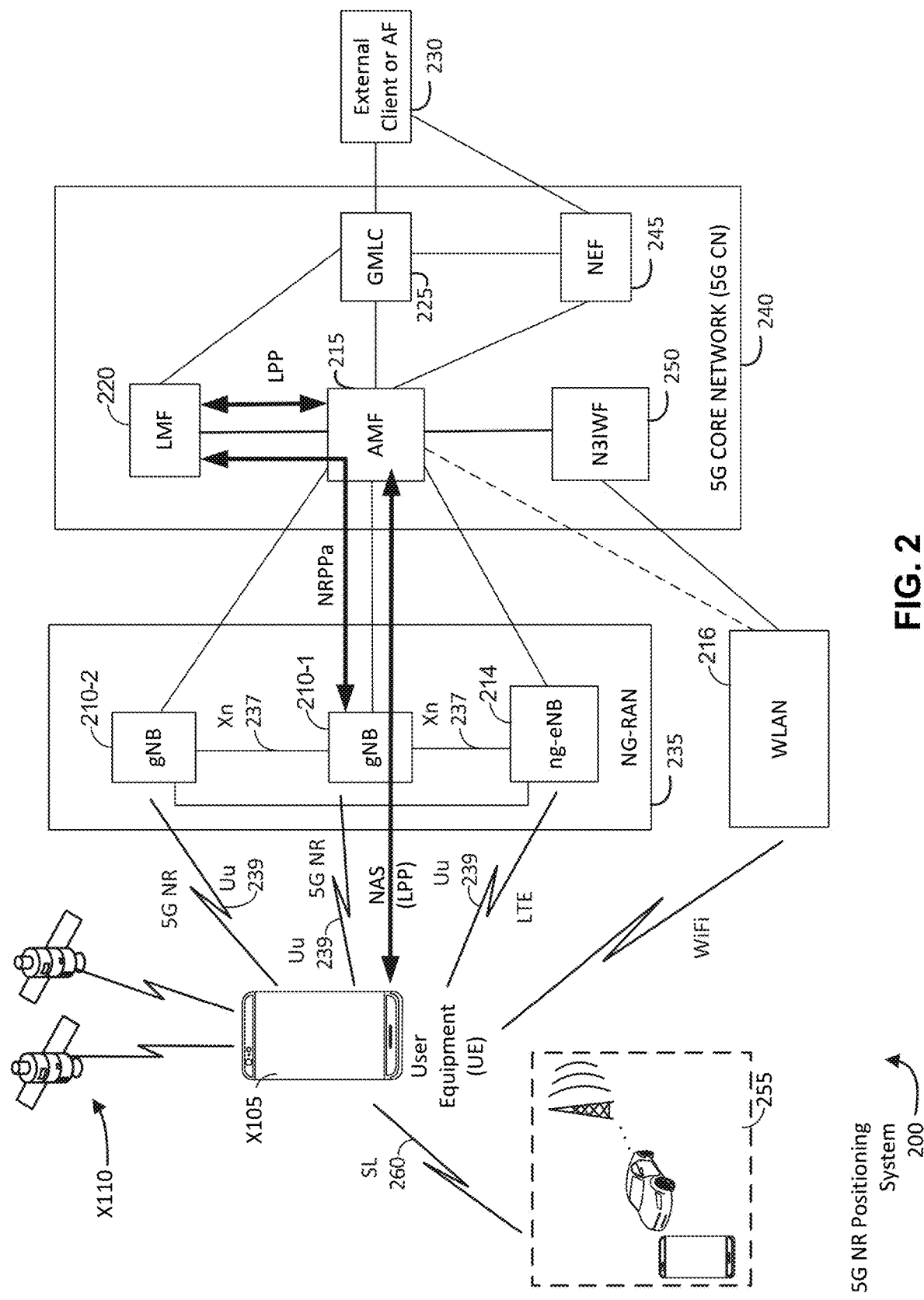
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-cNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of satellites 110, gNBs 210, ng-eNBs 214, Wireless Local Area Networks (WLANs) 216, Access and mobility Management Functions (AMF) s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X. Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-cNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-cNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (ELTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-cNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105 and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2. LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT. AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-cNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220, described in more detail hereafter.

Positioning of the UE 205 in a 5G NR positioning system 200 further may utilize measurements between the UE 205 and one or more other UEs 255 via a sidelink connection SL 260. As shown in FIG. 2, the one or more other UEs 255 may comprise any of a variety of different device types, including mobile phones, vehicles, roadside units (RSUs), other device types, or any combination thereof. One or more position measurement signals sent via SL 260 to the UE 205 from the one or more other UEs 255, to the one or more other UEs 255 from the UE 205, or both. Various signals may be used for position measurement, including sidelink PRS (SL-PRS). In some instances, the position of at least one of the one or more of the other UEs 255 may be determined at the same time (e.g., in the same positioning session) as the position of the UE 205. In some embodiments, the LMF 220 may coordinate the transmission of positioning signals via SL 260 between the UE 205 and the one or more other UEs 255. Additionally or alternatively, the UE 205 and the one or more other UEs 255 may coordinate a positioning session between themselves, without an LMF 220 or even a Uu connection 239 to an access node of the NG-RAN 235. To do so, the UE 205 and the one or more other UEs 255 may communicate messages via the SL 260 using sidelink positioning protocol (SLPP). In some scenarios, the one or more other UEs 255 may have a Uu connection 239 with an access node of the NG-RAN 235 and/or Wi-Fi connection with WLAN 216 when the UE 205 does not. In such instances, the one or more other UEs 255 may operate as relay devices, relaying communications to the network (e.g., LMF 220)

from the UE 205. In such instances, a plurality of other UEs 255 may form a chain between the UE 205 and the access node.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-cNB 214, or WLAN 216).

With a network based position method, one or more base stations (e.g., gNBs 210 and/or ng-cNB 214), one or more APs (e.g., in WLAN 216), or N3IWF 250 may obtain location measurements (e.g., measurements of RSSI, RTT, RSRP. RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
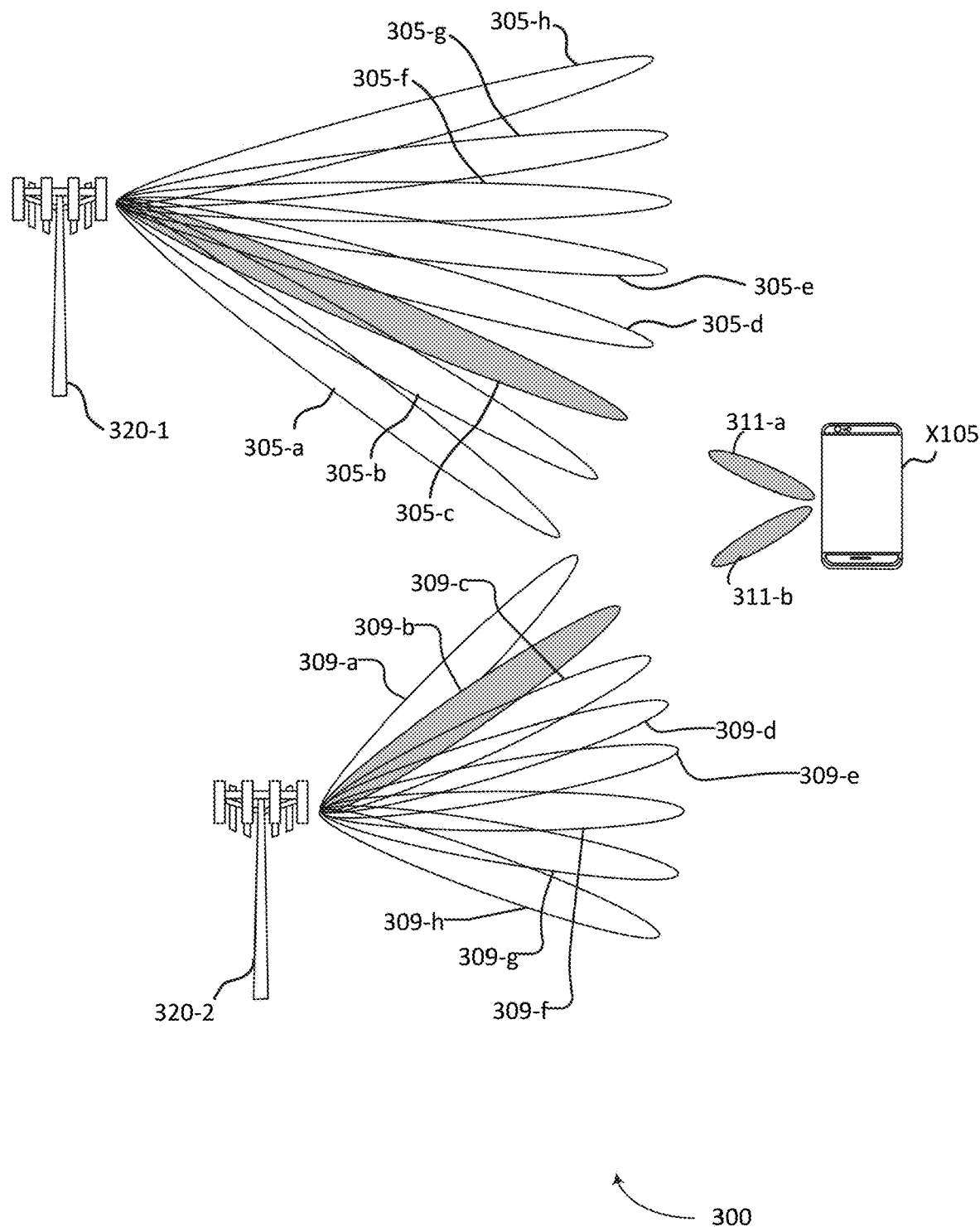
FIG. 3 is a diagram showing an example of how beamforming may be performed, according to some embodiments.

[If the invention needs a description of beamforming, use the following figure/description.] FIG. 3 is a diagram illustrating a simplified environment 300 including two base stations 320-1 and 320-2 (which may correspond to base stations 120 of FIG. 1 and/or gNBs 210 and/or ng-cNB 214 of FIG. 2) with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each directional beam may have a beam width centered in a different direction, enabling different beams of a base station 320 to correspond with different areas within a coverage area for the base station 320.

Different modes of operation may enable base stations 320-1 and 320-2 to use a larger or smaller number of beams. For example, in a first mode of operation, a base station 320 may use 16 beams, in which case each beam may have a relatively wide beam width. In a second mode of operation, a base station 320 may use 64 beams, in which case each beam may have a relatively narrow beam width. Depending on the capabilities of a base station 320, the base station may use any number of beams the base station 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a base station 320 may use beam sweeping. Beam sweeping is a process in which the base station 320 may send an RF signal in different directions using different respective beams, often in succession, effectively "sweeping" across a coverage area. For example, a base station 320 may sweep across 120 or 360 degrees in an azimuth direction, for each beam sweep, which may be periodically repeated. Each direction beam can include an RF reference signal (e.g., a PRS resource), where base station 320-1 produces a set of RF reference signals that includes Tx beams 305-*a*, 305-*b*, 305-*c*. 305-*d*, 305-*c*, 305-*f*, 305-*g*, and 305-*h*, and the base station 320-2 produces a set of RF reference signals that includes Tx beams 309-*a*, 309-*b*, 309-*c*, 309-*d*. 309-*c*, 309-*f*, 309-*g*, and 309-*h*. As noted, because UE 105 may also include an antenna array, it can receive RF reference signals transmitted by base stations 320-1 and 320-2 using beamforming to form respective receive beams (Rx beams) 311-*a* and 311-*b*. Beamforming in this manner (by base stations 320 and optionally by UEs 105) can be used to make communications more efficient. They can also be used for other purposes, including taking measurements for position determination (e.g., AoD and AoA measurements).

Figure 4:
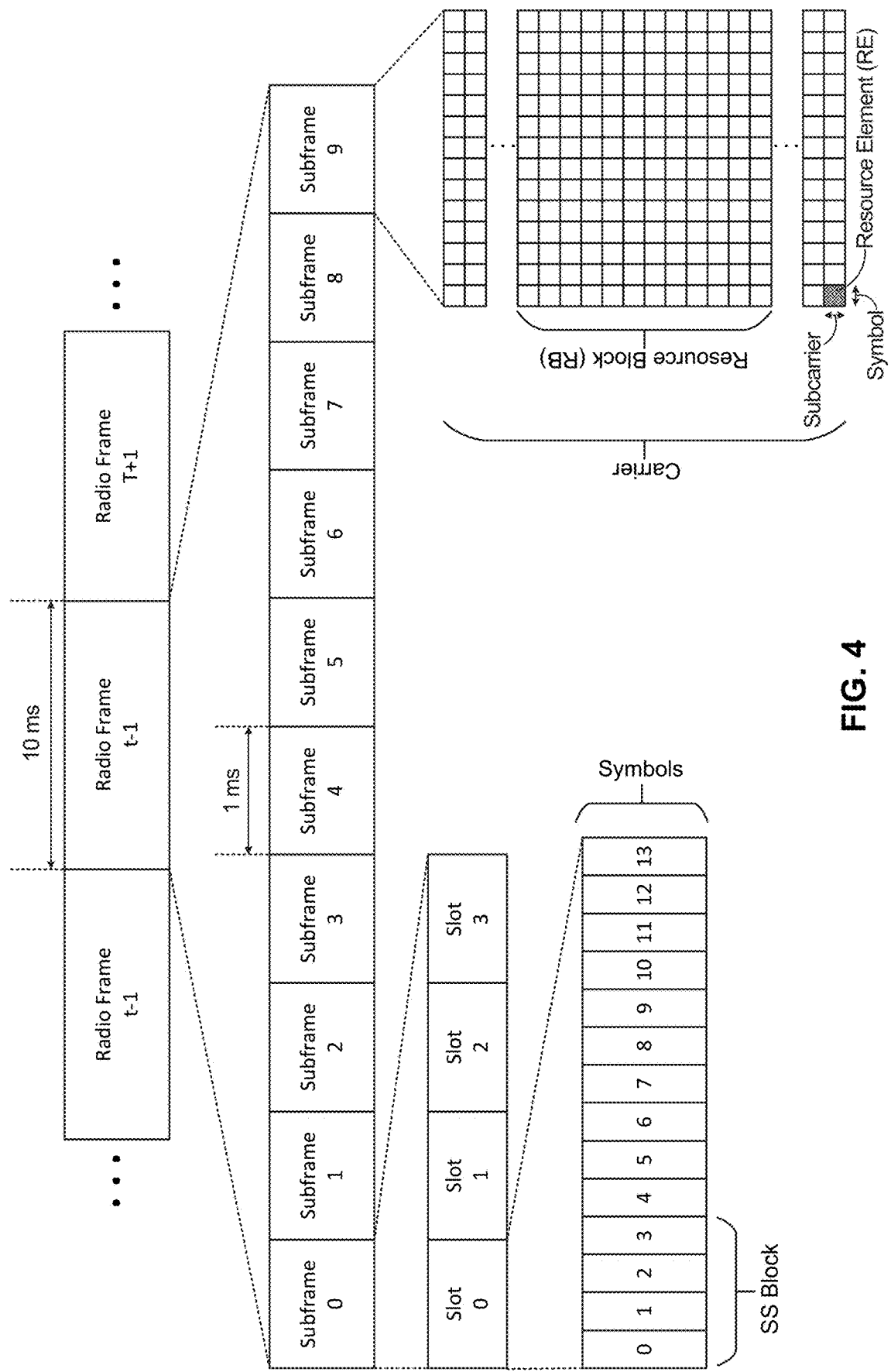
FIG. 4 is a diagram showing an example of a frame structure for NR and associated terminology.

[If the invention needs a description of the physical layer, use the following figure/description.] FIG. 4 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 4 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 5:
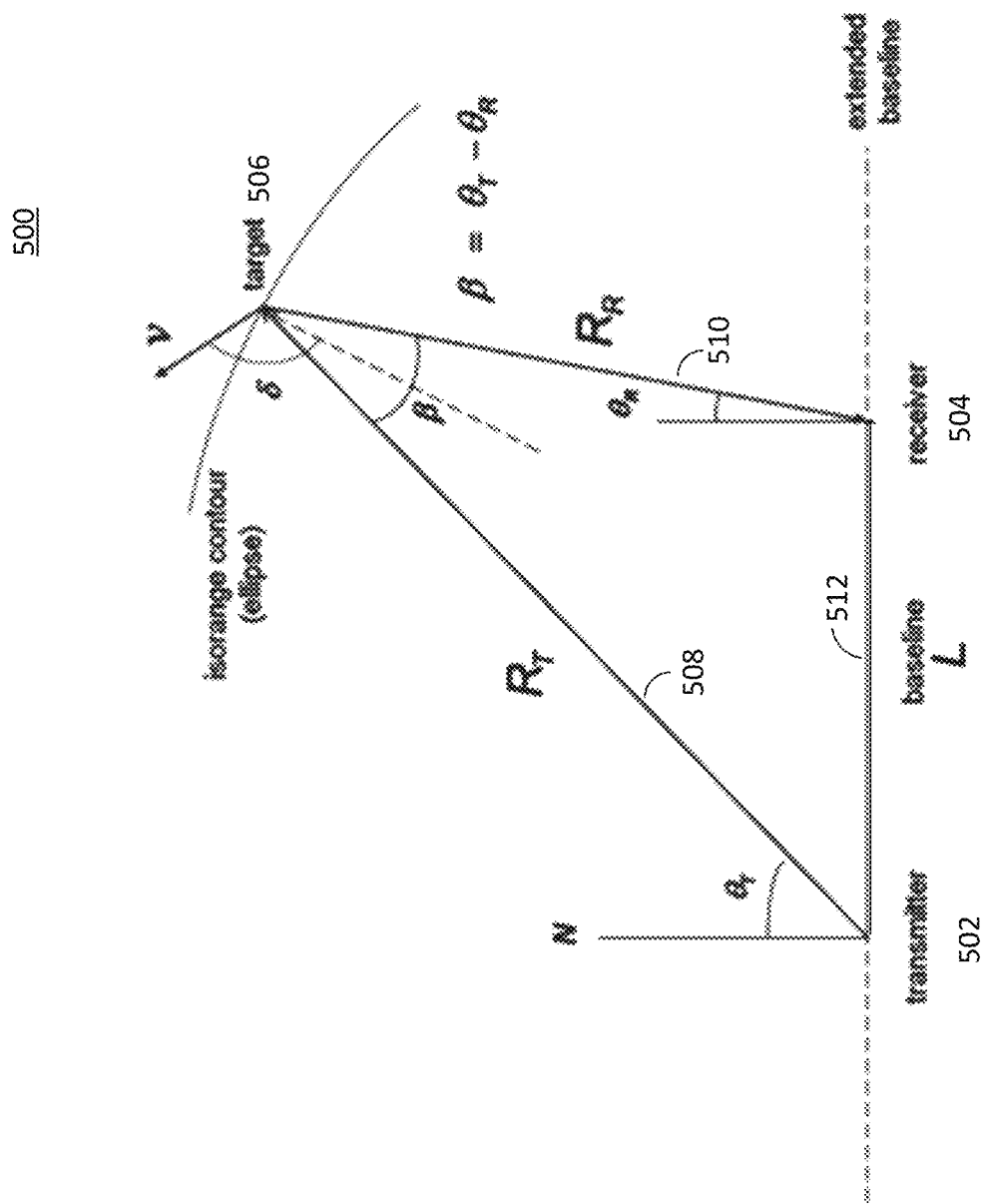
FIG. 5 is a simplified diagram showing the basic operation of a bistatic radar system.

FIG. 5 is a simplified diagram showing the basic operation of a bistatic radar system 500. A transmitter 502 and a receiver 504 are used to send and receive radar signals for sensing a target 506. For example, the transmitter 502 may be a base station or a user equipment (UE). Similarly, the receiver 504 may be a base station or a UE. While a bistatic radar example is shown, the same principals of operation can be applied to a multi-static radar, which utilizes multiple transmissions and/or receptions. For example, a multi-static radar may utilize one transmitter and two receivers. In another example, a multi-static radar may utilize two transmitters and one receiver. Larger numbers of transmitters and/or receivers may also be possible.

In bistatic radar system 500, the transmitter 502 sends a transmit signal 508 which traverses a distance $R_T$ to reach target 506. The transmit signal 508 reflects from the target 506 and becomes an echo signal 510 which traverses a distance $R_R$ to reach the receiver 504. A primary function served by bistatic radar system 500 is sensing the range, or distance $R_R$, from the target 506 to the receiver 504. The system determines the range $R_R$ primary by sensing the amount of time taken for the transmit signal 508 and echo signal 510 to traverse the total distance $R_{sum}$, which is the sum of $R_T$ and $R_R$:

$$R_{sum} = R_T + R_R \qquad \text{(Eq. 1)}$$

The total distance $R_{sum}$ defines an ellipsoid surface (also known as the iso-range contour) with foci at the locations of the transmitter 502 and the receiver 504, respectively. The ellipsoid surface represents all the possible locations of the target 506, given the total distance $R_{sum}$. The radar system 500 is capable of measuring the distance $R_{sum}$. For example, if perfect synchronization of timing between the transmitter 502 and the receiver 504 can be assumed, it would be easy to simply measure the time duration $T_{sum}$ between moment when the transmitter 502 sent the transmit signal 508 and moment when the receiver 504 received the echo signal 510. Multiplying the time duration $T_{sum}$ by the speed of the signal through free space, e.g., approximately c=3*10^8 meters/second, would yield $R_{sum}$. Thus, the ellipsoid surface of all possible locations of the target 506 can be found by measuring the "flight time" T sum of the bistatic radar signal.

According to some embodiments, the distance $R_{sum}$ can be measured without tight time synchronization between the transmitter 502 and the receiver 504. In one embodiment, a line-of-sight (LOS) signal 512 can be sent from the transmitter 502 to the receiver 504. That is, at the same time that transmitter 502 sends the transmit signal 508 toward the target 506, transmitter 502 may also send the LOS signal 512 toward the receiver 504. According to a specific embodiment, the transmit signal 508 may correspond to a main lobe of a transmit antenna beam pattern emitted from the transmitter 502, while the LOS signal 512 corresponds to a side lobe of the same transmit antenna beam pattern emitted from transmitter 502.

The receiver 504 receives both the echo signal 510 and the LOS signal 512 and can utilize the timing of the reception of these two signals to measure the total distance $R_{sum}$, using the expression:

$$R_{sum} = (T_{Rx\_echo} - T_{Rx_{LOS}}) * c + L \qquad \text{(Eq. 2)}$$

Here, $T_{Rx\_echo}$ is the time of reception of the echo signal 510. $T_{RxLOS}$ is the time of reception of the LOS signal 512. As mentioned, c=3*10^8 meters/second is the speed of the signal through free space. L is the distance between the transmitter 502 and the receiver 504. Once $R_{sum}$ is found, it can be used to calculate the target range $R_R$, i.e., the distance between the target 506 and the receiver 504, using the following expression:

$$R_R = \frac{R_{sum}^2 - L^2}{2(R_{sum} + L * \sin\theta_R)} \qquad \text{(Eq. 3)}$$

The bistatic radar system 500 can also be used to determine the angle of arrival (AoA) OR at which the echo signal 510 is received by receiver 504. This can be done in various ways. One way is to estimate OR by using an antenna array at the receiver 504. An antenna array, which comprises multiple antenna elements, can be operated as a programmable directional antenna capable of sensing the angle at which a signal is received. Thus, the receiver 504 may employ an antenna array to sense the angle of arrival of the echo signal 510. Another way to estimate OR involves multilateration. Multilateration refers to the determination of the intersection of two or more curves or surfaces that represent possible locations of a target. For example, the bistatic radar system 500 shown in FIG. 5 can define a first ellipsoid surface representing possible locations of the target 506, as described previously. A second bistatic radar system with a differently located transmitter and/or receiver can define a second, different ellipsoid surface that also represents the possible locations of the target 506. The intersection of the first ellipsoid surface and the second ellipsoid surface can narrow down the possible location(s) of the target 506. In three-dimensional space, four such ellipsoid surfaces would generally be used to reduce the possible location to a single point, thus identifying the location of target 506. In two-dimensional space (e.g., assuming all transmitters, receivers, and the targets are confined to the being on the ground), three such ellipsoid surfaces (for two-dimensional space, the ellipsoid surfaces reduce to elliptical curves) would generally be used to reduce the possible locations to a single point, thus identifying the location of target 506. Multilateration can also be achieved in a similar manner using multi-static radar system instead of multiple bistatic radar systems.

Furthermore, the bistatic radar system 500 can also be used to determine the Doppler shift frequency associated with the target 506. The Doppler shift frequency denotes the relative velocity of the target 506, from the perspective of the receiver 504—i.e., the velocity at which the target 506 is approaching/going away from the receiver 504. For a stationary transmitter 502 and a stationary receiver 504, the Doppler shift frequency of the target 506 can be calculated as:

$$f_D = \frac{2v}{c} * \cos\delta * \cos(\beta/2) \qquad \text{(Eq. 4)}$$

Here, $f_D$ is the Doppler shift frequency, v is the velocity of the target 506 relative to a fixed frame of reference defined by the stationary transmitter 502 and receiver 504. c is the speed of light. β is the angle formed between the transmit signal 508 and the echo signal 510 at the target 506. δ is the angle between the velocity vector v and the center ray (half angle) defined within angle β.

In FIG. 5, for ease of illustration, a fixed frame of refence is defined with respect to the stationary transmitter 502 and stationary receiver 504. However, in various embodiments, one or more of the transmitter and/or receiver may be mobile, as discussed in more detail in later sections. Referring to FIG. 5, a baseline of length L can be drawn between the transmitter 502 and the receiver 504. The baseline can be extended beyond the transmitter 502 and receiver 504. One or more normal lines can be drawn as being perpendicular to the baseline. A transmit angle $\theta_T$ can be defined relative to a normal line drawn from the location of the transmitter 502. A receive angle $\theta_R$, referred to above as the angle of arrival, can be defined relative to a normal line drawn from the location of the receiver 504.

As mentioned previously, bistatic radar system 500 can be operated to sense a target in two-dimensional space or three-dimensional space. An additional degree of freedom is introduced in the case of three-dimensional space. However, the same basic principles apply, and analogous calculations may be performed.

Figure 6:
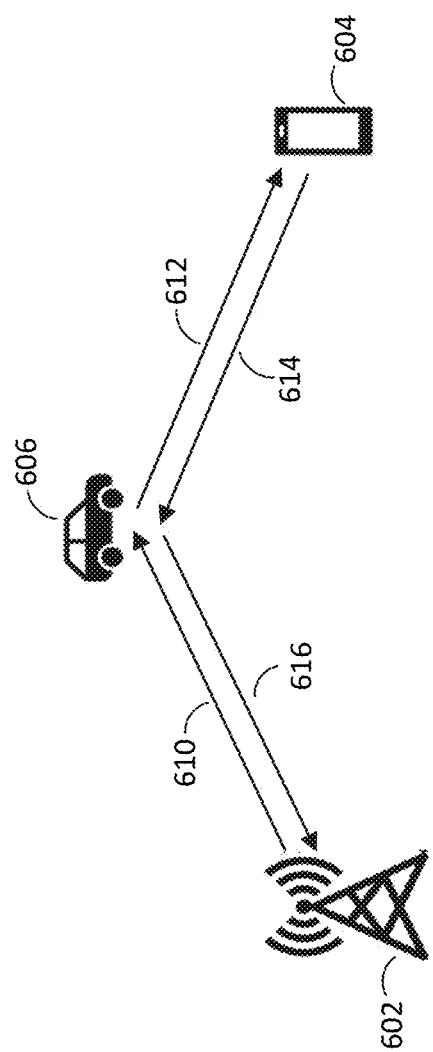
FIG. 6 is a diagram showing an example of a downlink (DL) signal and an uplink (UL) signal used for one or more bistatic radar measurements, according to an aspect of the disclosure.

FIG. 6 is a diagram showing an example of a downlink (DL) signal and an uplink (UL) signal used for one or more bistatic or multi-static radar measurements, according to an aspect of the disclosure. As shown, the DL and UL signals are transmitted and received by a base station 602 and a UE 604 and reflected off of a target 606. The order of transmission/reception of the DL and UL signals may differ depending on implementation. In the example shown, the base station 602 transmits a DL signal 610. The DL signal 610 may have a beam profile expansive enough to reach the target 606. The beam profile of the DL signal 610 may be expansive enough to reach other targets, as well, but only signal interactions with the target 606 are discussed in this example for case of illustration. The DL signal 610 reflects off of the target 606 as a reflected DL signal 612, which is received by the UE 604. In the reverse direction, the UE 604 transmits an UL signal 614. The UL signal 614 may have a beam profile expansive enough to reach the target 606. Similarly, the beam profile of the UL signal 614 may be expansive enough to reach other targets, but only signal interactions with the target 606 are discussed in this example for case of illustration. The UL signal 614 reflects off of the target 606 as a reflected UL signal 616, which is received by the base station 602. The target 606 may be an object or any entity capable of reflecting a signal. For example, the target 606 may be a vehicle, a pedestrian, roadside structure, a building, a wall, an obstruction, construction equipment, personal objects, or any other object in the environment.

The use of both a downlink signal and an uplink signal according to aspects of the disclosure facilitates the reduction of errors impacting Doppler estimates caused by issues such as oscillator offset and UE mobility. Here, an oscillator offset refers to the error in the output frequency of the oscillator—i.e., the difference between a nominal oscillator frequency (e.g., as intended to be provided) and the actual frequency of the signal produced by the oscillator. Oscillator offsets may exist at both the transmitter and the receiver of a wireless signal and may involve a UE and/or a base station. Typically, equipment such as the base station 602 and the UE 604 utilize oscillator(s) to upconvert transmit signals to a carrier frequency prior to transmission using antenna(s)/antenna array(s), as well as down-convert receive signals from a carrier frequency after reception using antenna(s)/antenna array(s). Each oscillator has a nominal oscillator frequency, which refers to the frequency that the oscillator is designed to nominally output. However, unless the oscillator is perfectly tuned, the actual output frequency produced by the oscillator is often slightly different from the nominal frequency. The difference between the oscillator's nominal frequency and its actual output frequency is referred to as the offset, or error, of the oscillator.

In practice, oscillators used at UEs generally have a more significant offset problem. UEs represent equipment that is often manufactured and deployed in large numbers, and the per unit cost of UEs may be tightly controlled. To decrease per unit cost, UEs may forego oscillators with higher precision specifications and/or offset compensation features, such as a temperature control feature to curtail effects of temperature-dependent frequency variation or a compensation feature that take a temperature reading and performs oscillator frequency compensation based on the temperature reading and a known relationship between temperature and oscillator offset. This can mean, for example, that UEs may experience more significant oscillator offsets in the course of normal operation. The offsets can be tied to changes such as temperature swings (e.g., during the course of a day). Oscillators used at base stations can also exhibit oscillator offsets, though typically to a lesser extent.

Oscillator offsets and UE mobility can each impact the accuracy of Doppler estimates (e.g., to measure the velocity of a target), especially when operated in conjunction with wireless communication equipment. Typically, wireless communication equipment (e.g., a wireless modem) only works to "zero out" the effects of oscillator offsets and UE mobility, through the process of demodulating the wireless signal. Specifically, components such as a frequency tracking loop (FTL) operate to track the frequency error associated with oscillator offsets and UE mobility. The operation of a typical FTL drives the frequency error to zero, e.g., by use of a voltage controlled oscillator (VCO). Such an approach provides satisfactory modem performance, i.e., it achieves the successful demodulation of the digital data carried in the wireless communication signal. However, for purposes of sensing, wireless communication equipment may fail to quantify the impact of oscillator offsets and UE mobility. A conventional wireless modem that receives the wireless signal and observes a frequency shift cannot distinguish between the possible sources of the frequency shift, which can include Doppler effects associated with the mobility of the target, oscillator offsets, and Doppler effects associated with the mobility of the UE. As a result, accurate Doppler measurements of the target's movement based on wireless signals may be difficult to achieve.

Figure 7A:
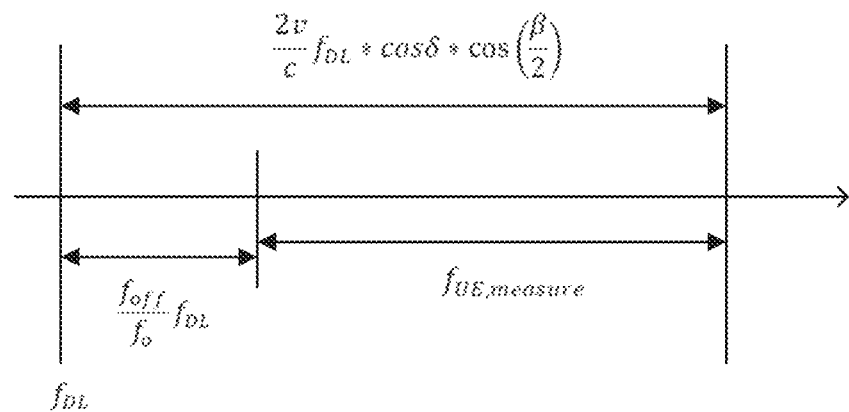
FIG. 7A is a normalized frequency diagram illustrating the effect of a UE RX oscillator offset on the measured frequency of a downlink signal received by a UE.
Figure 7B:
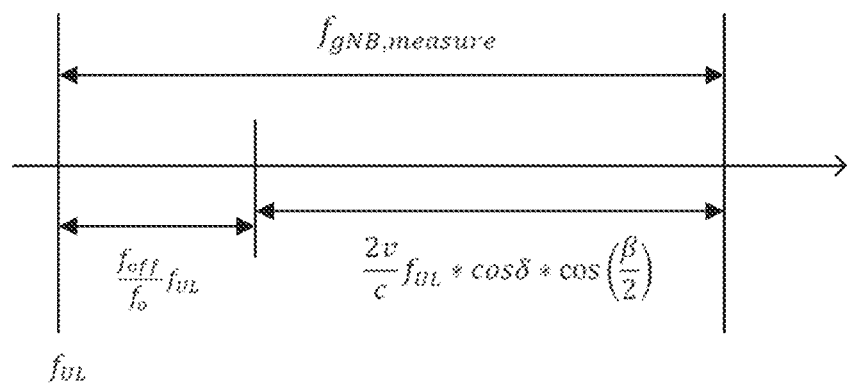
FIG. 7B is a normalized frequency diagram illustrating the effect of a UE TX oscillator offset on the measured frequency of an uplink signal received by a base station.

FIG. 7A is a normalized frequency diagram illustrating the effect of a UE receive (RX) oscillator offset on the measured frequency of a downlink signal received by a UE. FIG. 7B is a normalized frequency diagram illustrating the effect of a UE transmit (TX) oscillator offset on the measured frequency of an uplink signal received by a base station. The effects of oscillator offsets can be described in relation to the measured frequency of the uplink (UL) and downlink (DL) signals. Relevant parameters may include:

$$f_{DL} = DL \text{ carrier frequency} \quad \text{(Eq. 5)}$$

$$f_{UL} = UL \text{ carrier frequency} \quad \text{(Eq. 6)}$$

$$f_{gNB,measure} = \text{frequency offset measured at } gNB \quad \text{(Eq. 7)}$$

$$f_{UE,measure} = \text{frequency offset measured at } UE \quad \text{(Eq. 8)}$$

$$\frac{f_{off}}{f_o} f_{DL} = \text{Shift caused by } UE \text{ oscillator error in } DL \text{ } (RX) \quad \text{(Eq. 9)}$$

$$\frac{f_{off}}{f_o} f_{UL} = \text{Shift caused by } UE \text{ oscillator error in } UL \text{ } (TX) \quad \text{(Eq. 10)}$$

Here, the DL carrier frequency $f_{DL}$ refers to the frequency of the downlink signal (e.g., DL signal 610) as it is transmitted by the base station (e.g., base station 602). The UL carrier frequency $f_{UL}$ refers to the frequency of the uplink signal (e.g., UL signal 614) as it is transmitted by the UE (e.g., UE 604). The frequency offset $f_{gNB,measure}$ measured at the base station refers to the difference between the UL carrier frequency $f_{UL}$ and the actual frequency of the uplink signal measured at the base station. The frequency offset $f_{UE,measure}$ measured at the UE refers to the difference between the DL carrier frequency $f_{DL}$ and the actual frequency of the downlink signal measured at the UE. As mentioned previously with respect to FIG. 5, the Doppler shift frequency of the target 506 can be calculated as $f_D = 2v/c * \cos \delta * \cos(\beta/2)$. The UE oscillator error $$\frac{f_{off}}{f_o} f_{DL}$$

in the DL direction refers to the shift in the frequency of the downlink signal as measured by the UE (e.g., UE 604) as result of down conversion performed at the UE (e.g., UE 604) after reception, using an oscillator having an oscillator error. The UE oscillator error $$\frac{f_{off}}{f_o} f_{UL}$$

in the UL direction refers to the shift in the frequency of the uplink signal as measured by the base station (e.g., base station 602) as result of up conversion performed at the UE (e.g., UE 604) before transmission, using an oscillator having an oscillator error.

Referring to FIGS. 7A and 7B, it can be shown that, if the UE uses the same local oscillator for both transmit and receive operations—i.e., for both down-converting the reflected downlink signal (e.g., reflected DL signal 612) after reception using one or more antenna(s) or antenna array(s) and upconverting the uplink signal (e.g., UL signal 614) prior to transmission using one or more antenna(s) or antenna array(s), the normalized frequency offset $$\frac{f_{UE,measure}}{f_{DL}}$$

measured by the UL and the normalized frequency offset $$\frac{f_{gNB,measure}}{f_{UL}}$$

measured by the base station may be expressed as:

$$\frac{f_{UE,measure}}{f_{DL}} = 2\frac{v}{c} * \cos\delta * \cos\left(\frac{\beta}{2}\right) - \frac{f_{off}}{f_o} \quad \text{(Eq. 11)}$$

$$\frac{f_{gNB,measure}}{f_{UL}} = 2\frac{v}{c} * \cos\delta * \cos\left(\frac{\beta}{2}\right) + \frac{f_{off}}{f_o} \quad \text{(Eq. 12)}$$

According to an aspect of the disclosure, the target velocity (v) corresponding to the bistatic Doppler shift can be computed by averaging the normalized frequency offset $$\frac{f_{UE,measure}}{f_{DL}}$$

measured by the UE and the normalized frequency offset $$\frac{f_{gNB,measure}}{f_{UL}}$$

measured by the base station. This can be done by combining Equations 11 and 12, which allows the negative oscillator offset component attributed to the use of the local oscillator for down conversion at the UE to cancel out the positive oscillator offset component attributed to the use of the same local oscillator for up conversion at the UE:

$$v * \cos\delta * \cos\left(\frac{\beta}{2}\right) = \frac{c}{4}\left(\frac{f_{gNB,measure}}{f_{UL}} + \frac{f_{UE,measure}}{f_{DL}}\right) \quad \text{(Eq. 13)}$$

The target velocity (v) can thus be computed by averaging the normalized frequency offset measured by the UE and the normalized frequency offset measured by the base station. The computed target velocity (v) is isolated from errors introduced by the existence of the oscillator offset. A benefit of such an approach is that the target velocity (v) can be computed without estimating or compensating for the oscillator offset at the UE, which can greatly simplify implementation of RF sensing measurements. For example, the UE may not need to estimate its local oscillator offset or take steps to compensate for its local oscillator offset. A sensing server may perform the operation of computing the target velocity (v), e.g., by computing an average of the normalized frequency offset measure the UE and the normalized frequency offset measured by the base station, as described above. The sensing server may be implemented as a part the base station. Alternatively or additionally, the sensing server may be implemented in a server apart from the base station. Such arrangements are discussed in more detail in later sections.

The example above only describes the effects of oscillator error(s) at the UE. As previously mentioned, oscillators errors associated with oscillators at the UE may be more significant in many implementations, as compared to oscillator errors associated with oscillators at the base station. Generally speaking, UEs are produced in great numbers (as compared to base stations), and per unit cost is more controlled and limited. As a result, the oscillator(s) used in a typical UE may be less precise and have greater errors, and UEs are less likely to implement features for oscillator offset compensation. By contrast, base stations may implement more precise oscillator tuning and/or oscillator offset compensation features. Nevertheless, effects of oscillator error(s) at the base station may be evaluated in a similar manner.

In addition, the computation of the target velocity (v) as described above also cancels out the contributions of UE mobility on the measured frequency of the downlink and uplink signals. The Doppler effects of UE mobility has not been explicitly mentioned in the computations described thus far. However, any motion of the UE can create a Doppler effect on the measured frequency of the downlink, as well as the measured frequency of the uplink signals. For example, if effects of UE mobility were taken into account, expressions for the normalized frequency offset $$\frac{f_{UE,measure}}{f_{DL}}$$

measured by the UE and the normalized frequency offset $$\frac{f_{gNB,measure}}{f_{UL}}$$

measured by the base station may be expressed as:

$$\frac{f_{UE,measure}}{f_{DL}} = 2\frac{v}{c} * \cos\delta * \cos\left(\frac{\beta}{2}\right) - \frac{f_{off}}{f_o} + f_{UE\_mobility} \quad \text{(Eq. 14)}$$

$$\frac{f_{gNB,measure}}{f_{UL}} = 2\frac{v}{c} * \cos\delta * \cos\left(\frac{\beta}{2}\right) + \frac{f_{off}}{f_o} - f_{UE\_mobility} \quad \text{(Eq. 15)}$$

By combining equations 14 and 15, it can be shown that the Doppler effects of UE mobility can also be cancelled out, along with the oscillator offsets associated with use of a local oscillator for both reception and transmission at the UE. Here, the target velocity (v) can be computed without specifically estimating or compensating for the movement of the UE, which can greatly simply implementation and improve accuracy. Thus, the target velocity (v) can be computed by averaging the normalized frequency offset measured by the UE and the normalized frequency offset measured by the base station. The operation cancels out both the errors introduced by the existence of the oscillator offset and the Doppler effects of UE mobility. The computation, which averages the normalized frequency offset measured by the UE and the normalized frequency offset measured by the base station, again reflects Equation 13.

Once again, a sensing server may perform the operation of computing the target velocity (v), e.g., by computing an average of the normalized frequency offset measure the UE and the normalized frequency offset measured by the base station, as described above. The sensing server may be implemented as a part the base station. Alternatively or additionally, the sensing server may be implemented in a server apart from the base station. Such arrangements are discussed in more detail in later sections.

Figure 8:
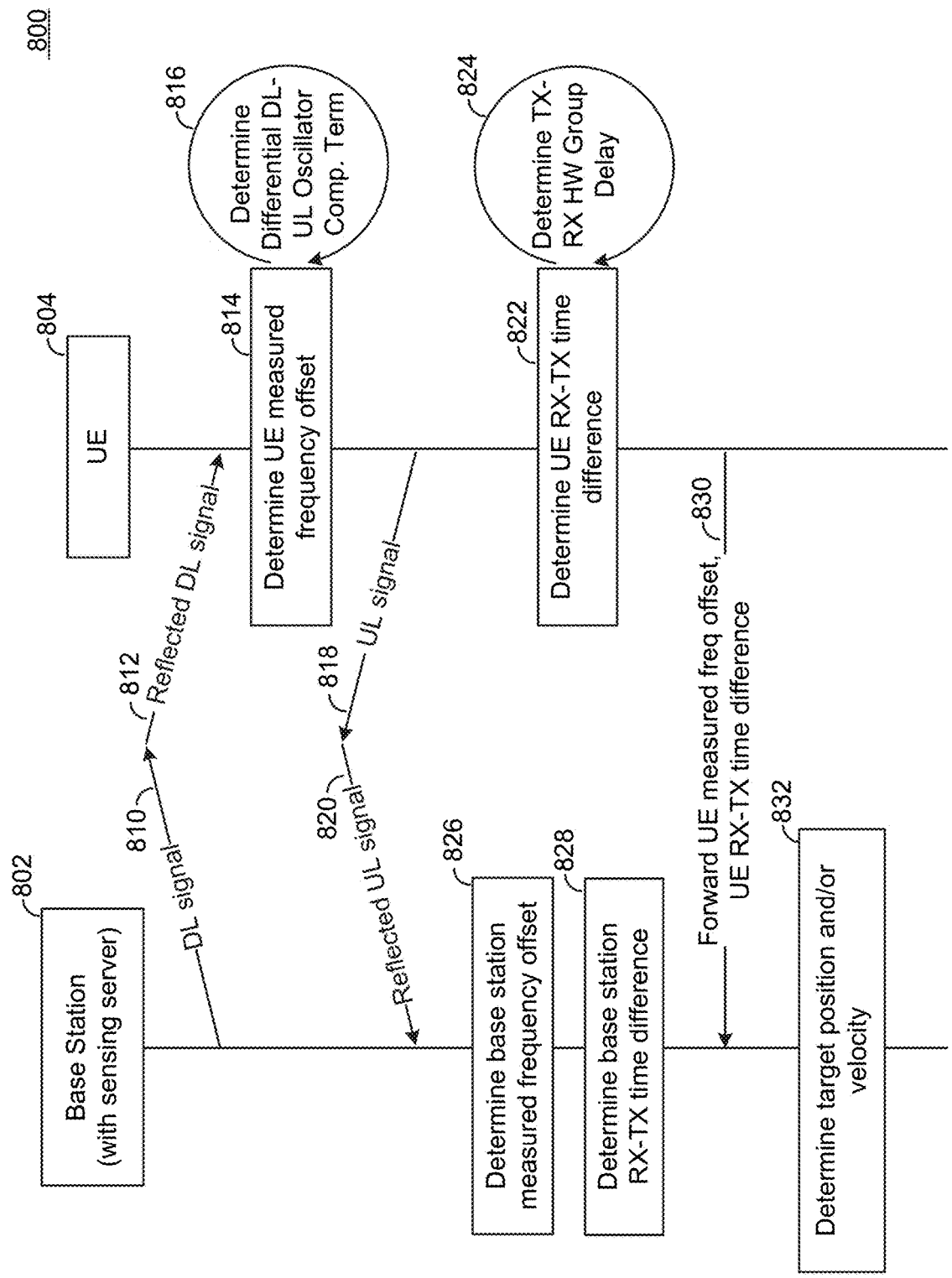
FIG. 8 is a signal flow diagram showing the transmission and reception of a DL signal and an UL signal, with RX-TX time difference and measured frequency offset being reported to a sensing server implemented as part of a base station.

FIG. 8 is a signal flow diagram 800 showing the transmission and reception of a DL signal and an UL signal, with RX-TX time difference and measured frequency offset being reported to a sensing server implemented as part of a base station. The operations shown in the signal flow diagram 800 represents an example of a generalized DL+UL based bistatic sensing scheme. Here, the sensing scheme involves a base station 802 and a UE 804. The base station 802, which implements a sensing server (e.g., radar server), transmits a DL signal 810. The DL signal 810 may be transmitted in different ways. For example, the base station 802 may transmit the DL signal 810 as a directional beam formed using an antenna array, as discussed previously. Here, the beam width and reach of the directional beam embodying the DL signal 810 may be sufficiently wide and far to reach a target (not shown). The DL signal 810 reflects off of the target to form a reflected signal 812. The UE 804 receives the reflected DL signal 812. The UE 804 may receive the reflected DL signal 812 in different ways. For example, the UE 804 may receive the reflected DL signal 812 with one or more receive directional beams formed using an antenna array, as discussed previously.

At 814, the UE 804 determines a UE measured frequency offset $f_{UE,measure}$ in connection with receiving the reflected DL signal 812. The UE 804 may be aware of the RF frequency $f_{DL}$ at which the reflected DL signal 812 is expected to be located (without taking into account Doppler effects and/or one or more oscillator offsets). The UE 804 is also capable of determining the RF frequency at which the reflected DL signal 812 is actually received. The UE 804 may determine the UE measured frequency offset $f_{UE,measure}$ as the difference between the RF frequency $f_{DL}$ at which the reflected DL signal 812 is expected to be located and the RF frequency at which the reflected DL signal 812 is actually received. Factors that may introduce shifts in the measured frequency of the reflected DL signal 812 upon reception include, for example, Doppler effects associated with the movement of the target, Doppler effects associated with the movement of the UE 804, and effects of an RX oscillator error or offset $f_{off\_DL}$ associated with an oscillator used in down-converting the reflected DL signal 812 at the UE 804 after reception. In this embodiment, the effects of oscillator errors at the base station may be ignored because they are relatively small given the more precise oscillator tuning available at the base station.

The UE 804 may be aware of the RF frequency $f_{DL}$ at which the reflected DL signal 812 is expected to be located, for example, because the UE 804 has knowledge of the carrier frequency associated with the resource element(s) to which the DL signal 810 is assigned. Based on such knowledge, the UE 804 attempts to receive the reflected DL signal 812 at the carrier frequency and during the time slot(s) associated with the one or more assigned resource element(s). The UE 804 may utilize a combination of analog/digital as well as hardware/software components to determine the RF frequency at which the reflected DL signal 812 is actually received.

Just as an example, the UE 804 may estimate the RF frequency at which the reflected DL signal 812 is actually received by combining a coarse RX frequency estimate (CFE) with a fine RX frequency estimate (FFE). The CFE may be determined, e.g., from settings associated with a temperature compensation feature of the RX local oscillator. For instance, the UE 804 may incorporate settings used to cancel, reduce, or otherwise account for the temperature-dependent nature of the RX local oscillator. The UE 804 may store a look-up table of compensation parameters associated with different temperatures. A temperature sensor aboard the UE 804 may generate a temperature measurement, which may be used as an input to the look-up table to produce a compensation parameter. The compensation parameter may be used to provide appropriate adjustment to the output frequency of the oscillator signal (e.g., by supplying an appropriate divide-down parameter for an oscillator clock circuit). Thus, through its knowledge of settings such as the temperature-dependent oscillator compensation parameter used, the UE 804 may generate the CFE. The FFE may be determined, e.g., from digital signal processing operations performed after the reflected DL signal 812 has been sampled and converted to digital form. Once the reflected DL signal 812 has been converted to digital form, signal processing operations may include further frequency shifts performed in the digital domain. Such operations may yield an additional frequency estimate in the form of an FFE. According to some embodiments, the UE 804 may combine the CFE and FFE to generate an estimate of the RF frequency at which the reflected DL signal 812 is actually received.

In some embodiments, the UE is expected to compensate for a frequency offset caused by oscillator differences. For example, at 816, the UE 804 may determine a UE measured frequency offset that includes a differential DL-UL oscillator compensation term corresponding to a difference between a TX oscillator frequency error associated with the TX local oscillator and an RX oscillator frequency error associated with the RX local oscillator. In such embodiments, the UE 804 may down-convert the reflected DL signal 812 using a RX local oscillator and upconvert an uplink signal (described later) using a separate TX local oscillator. As a result, the normalized frequency offset $$\frac{f_{UE,measure}}{f_{DL}}$$

measured by the UE and the normalized frequency offset $$\frac{f_{gNB,measure}}{f_{UL}}$$

measured by the base station can be shown to be represented by:

$$\frac{f_{UE,measure}}{f_{DL}} = 2\frac{v}{c} * \cos\delta * \cos\left(\frac{\beta}{2}\right) - \frac{f_{off\_DL}}{f_{o\_DL}} \quad \text{(Eq. 16)}$$

$$\frac{f_{gNB,measure}}{f_{UL}} = 2\frac{v}{c} * \cos\delta * \cos\left(\frac{\beta}{2}\right) + \frac{f_{off\_UL}}{f_{o\_UL}} \quad \text{(Eq. 17)}$$

Here, $f_{off\_DL}$ is the UE oscillator error in the DL direction (RX), and $f_{o\_DL}$ is the nominal frequency of the local RX oscillator at the UE. $f_{off\_UL}$ is the UE oscillator error in the UL direction (TX), and $f_{o\_UL}$ is the nominal frequency of the local TX oscillator at the UE.

By reporting a UE measured frequency offset $f_{UE,measure}$ that comprises a differential oscillator compensation term (e.g., "delta") corresponding to a difference between a TX oscillator frequency error associated with the TX local oscillator and an RX local oscillator frequency error associated with the RX local oscillator, the UE 804 ensures that shifts introduced by the difference between the TX oscillator frequency error and the RX oscillator frequency error can easily be cancelled at the sensing server, e.g., at the base station. Doing so ensures that:

$$\frac{f_{off\_UL}}{f_{o\_UL}} - \frac{f_{offDL}}{f_{oDL}} + \text{delta} = 0 \quad \text{(Eq. 18)}$$

For instance, the UE 804 may have characterized both the RX local oscillator and the TX local oscillator, e.g., by implementing a temperature compensation look-up table for the TX local oscillator and a temperature compensation look-up table for the RX local oscillator. Thus, the UE 804 is in control and aware of the temperature-based compensation implemented for both the RX oscillator and TX oscillator, including any frequency errors associated with each oscillator (e.g., before and/or after compensation). According to some embodiments, the TX oscillator frequency error is less than or equal to a maximum limit defined by a standard, such as 3GPP Technical Specification Group Radio Access Network (TSG RAN), RAN WG4 (RAN4). For example, the RAN4 standard may specify that the TX oscillator frequency error must be less than or equal to a particular TX frequency error maximum limit, in order to conform to a residual calibration error budget. Similarly, in some embodiments, the RX oscillator frequency error is less than or equal to a maximum limit defined by a standard, such as RAN4, to conform to a residual calibration error budget.

A difference between the TX oscillator frequency error associated with the TX local oscillator and the RX oscillator frequency error associated with the RX local oscillator may account for an additional shift in the UE measured frequency offset. Here, the UE 804 is responsible for estimating such a differential DL-UL oscillator compensation term and including it as part of the UE measured frequency offset $f_{UE,measure}$. Accordingly, the UE may facilitate computation of the target velocity (v) corresponding to the bistatic Doppler shift by averaging the normalized frequency offset $$\frac{f_{UE,measure}}{f_{DL}}$$

measured by the UE and the normalized frequency offset $$\frac{f_{gNB,measure}}{f_{UL}}$$

measured by the base station, even when different local oscillators are used for down conversion of the received reflected DL signal and up conversion of the transmitted UL signal:

$$v * \cos\delta * \cos\left(\frac{\beta}{2}\right) = \frac{c}{4}\left(\frac{f_{gNB,measure}}{f_{UL}} + \frac{f_{UE,measure}}{f_{DL}} + \text{delta}\right) \quad \text{(Eq. 19)}$$

In other embodiments, the UE measured frequency offset $f_{UE,measure}$ comprises no oscillator compensation term (e.g., "delta"). For example, the UE 804 may do so by using the same local oscillator for down-converting the reflected DL signal 812 and upconvert an uplink signal (as opposed to using separate TX and RX local oscillators). As described previously, such embodiments also allow for cancellation of the effects of oscillator offsets, because the same oscillator is used for down-converting at reception and upconverting at transmission. In such embodiments, the target velocity (v) corresponding to the bistatic Doppler shift may be computed by averaging the normalized frequency offset $$\frac{f_{UE,measure}}{f_{DL}}$$

measured by the UE and the normalized frequency offset $$\frac{f_{gNB,measure}}{f_{UL}}$$

measured by the base station (e.g., as described in Eq. 13).

In the reverse direction, the UE 804 transmits an UL signal 818. The UL signal 818 may be transmitted in different ways. For example, the UE 804 may transmit the UL signal 818 as a direction beam formed using an antenna array, as discussed previously. The beam width and reach of the direction beam embodying the UL signal 818 may be sufficiently wide and far to reach the same target (now shown). The UL signal 818 reflects off of the target to form a reflected UL signal 820. The base station 802 receives the reflected UL signal 820. The base station 802 may receive the reflected UL signal 820 in different ways. For example, the base station 802 may receive the reflected UL signal 820 with one or more receive directional beams formed using an antenna array, as described previously.

At 822, the UE 804 determines a UE RX-TX time difference $T_{UE,RX\_TX}$, which may represent a time delay between the time at which the UE 804 receives the reflected DL signal 812 and the time at which the UE 804 transmits the UL signal 818. Such time delay may include one or more components. One component may be a UE TX-RX hardware group delay, which is determined at 824. The UE TX-RX hardware group delay may comprise (a) an RX group delay compensation term corresponding to the propagation delay of the reflected DL signal 812 through the receive circuitry (e.g., analog circuitry and/or digital RX circuitry) at the UE 804 and (b) a TX group delay compensation term corresponding to propagation delay of the UL signal 818 through the transmit circuitry (e.g., analog circuitry and/or TX digital circuitry) at the UE 804. For example, the RX and TX group delays associated the receive and transmit analog circuitry, respectively, of the UE 804 may be characterized (e.g., at time of manufacture) and stored as fixed values or in the form of a look-up table of values. If the propagation delays are temperature-dependent, a temperature value measured at the UE 804 using a temperature sensor may be used as an input to the look-up table to obtain the RX group delay and/or the TX group delay.

In the example shown, the DL signal 810 is transmitted first, followed by the transmission of the UL signal 818. However, the order of the DL and UL signal transmissions can vary in different embodiments. The DL signal 810 may be transmitted before, after, or partially or fully during the transmission of the UL signal 818. The UE RX-TX time difference, described previously, may be reported as a value having a positive or negative sign to reflect the order of the DL and UL signal transmissions. As mentioned above, the transmissions of the DL signal 810 and the UL signal 818 may be scheduled based on one or more resources. In some embodiments, the transmission of the DL signal 810 and the transmission of the UL signal 818 are scheduled to be relatively close in time, in order to place limits on the extent to which the target can move or change its velocity between the moment when the DL signal 810 reflects off of the target and the moment when the UL signal 818 reflects off of the target.

At 826, upon receiving the reflected UL signal 820, the base station 802 determines a base station (BS) measured frequency offset $f_{gNB,measure}$ in connection with receiving the reflected UL signal 820. The base station 802 may be aware of the RF frequency $f_{UL}$ at which the reflected UL signal 820 is expected to be located (without taking into account Doppler effects and/or one or more oscillator offsets). The base station 802 is also capable of determining the RF frequency at which the reflected UL signal 820 is actually received. The base station 802 may determine the BS measured frequency offset $f_{gNB,measure}$ as the difference between the RF frequency $f_{UL}$ at which the reflected UL signal 820 is expected to be located and the RF frequency at which the reflected UL signal 820 is actually received. Factors that may introduce shifts in the measured frequency of the reflected UL signal 820 upon reception include, for example, Doppler effects associated with the movement of the target, Doppler effects associated with the movement of the UE 804, and effects of a TX oscillator error or offset $f_{off\_UL}$ associated with an oscillator used in upconverting the UL signal 818 at the UE 804 before transmission. In this embodiment, the effects of oscillator errors at the base station may be ignored because they are relatively small given the more precise oscillator tuning available at the base station.

The base station 802 may be aware of the RF frequency $f_{UL}$ at which the reflected UL signal 820 is expected to be located, for example, because the base station 802 has knowledge of the carrier frequency associated with the resource element(s) to which the UL signal 818 is assigned. Based on such knowledge, the base station 802 attempts to receive the reflected UL signal 820 at the carrier frequency during the time slot(s) associated with the one or more assigned resource element(s). The base station 802 may utilize a combination of analog/digital as well as hardware/software components to determine the RF frequency $f_{UL}$ at which the reflected UL signal 820 is actually received, e.g., by combining a coarse RX frequency estimate and a fine RX frequency estimate, in a manner similar to that described previously with respect to the UE 804. However, the base station 802 may do so with more precise frequency estimation and oscillator error compensation than achievable at the UE 804.

At 828, the base station 802 determines a base station RX-TX time difference $T_{gNB,RX\_TX}$, which may represent a time delay between the time at which the base station 802 transmits the DL signal 810 and the time at which the base station 802 receives the reflected UL signal 820. Such time delay may include one or more components. In some embodiments, the base station RX-TX time difference $T_{gNB,RX\_TX}$ constitutes a total round-trip time that comprises (1) the TX over-the-air propagation time for the DL signal 810 to travel from the base station 802 to the target and for the reflected DL signal 812 to travel from the target to the UE 804, (2) the UE RX-TX time difference $T_{UE,RX\_TX}$, and (3) the RX over-the-air propagation time for the UL signal 818 to travel from the UE 804 to the target and for the reflected UL signal 820 to travel from the target to the base station 802. In determining the base station RX-TX time difference $T_{gNB,RX\_TX}$, the base station 802 may take into account a base station TX-RX hardware group delay associated with the propagation of the DL signal 810 through the transmit circuitry and the propagation of the reflected UL signal through the receive analog circuitry at the base station 802. The base station TX-RX hardware group delay may be stored as one or more fixed values or obtained from a look-up table, e.g., indexed based on a temperature sensor input value.

At 830, the UE 804 forwards the UE measured frequency offset $f_{UE,measure}$ and the UE RX-TX time difference $T_{UE,RX\_TX}$ to the base station 802. For example, the values may be sent in an uplink data message from the UE 804 to the base station 802. Alternatively, the values may be sent in a network message via a wired network from the UE 804 to the base station 802 (or to a sensing server implemented apart from the base station 802).

In some embodiments, the UE associates each pair of RX-TX time difference and frequency offset values measured at the UE with a target identifier and a time stamp. For example, the UE 804 may forward the pair of values representing the UE RX-TX time difference $T_{UE,RX\_TX}$ and the UE measured frequency offset $f_{UE,measure}$, along with an associated target ID and a time stamp, to the base station 802. Similarly, in some embodiments, the base station associates each pair of RX-TX time difference and frequency offset values measured at the base station with a target identifier and a time stamp. For example, the base station 802 may associate the pair of values representing the base station RX-TX time difference $T_{gNB,RX\_TX}$ and the base station measured frequency offset $f_{gNB,measure}$ with an associated target ID and a time stamp. The base station may forward the pair of values with the associated target ID and time stamp to the base station 802.

At 832, a sensing server implemented as part of the base station 802 may determine the position and/or velocity of the target. Computations of the position and/or velocity of the target may be based on measurements such as the UE measured frequency offset $f_{UE,measure}$ and the UE RX-TX time difference $T_{UE,RX\_TX}$ forwarded by the UE 804, as well as the BS measured frequency offset $f_{gNB,measure}$ and the base station RX-TX time difference $T_{gNB,RX\_TX}$ measured by the base station 802. For example, the sensing server may compute the velocity (v) of the target by averaging the normalized frequency offset measured by the UE and the normalized frequency offset measured by the base station. This may be done in accordance with Eq. 13 (in the case of using the same local oscillator for RX and TX at the UE 804) or Eq. 19 (in the case of using separate RX local oscillator and TX local oscillator at the UE 804). The sensing server may compute the position of the target in various ways. For example, using the target ID and time stamp mentioned above, the base station 802 (e.g., a sensing server implemented within the base station) may keep track of numerous pairs of RX-TX time difference and frequency offset values received one or more UEs regarding one or more targets, to perform bistatic radar measurements involving multiple UEs and/or multiple targets (e.g., as described later with respect to FIGS. 10 and 12).

Figure 12:
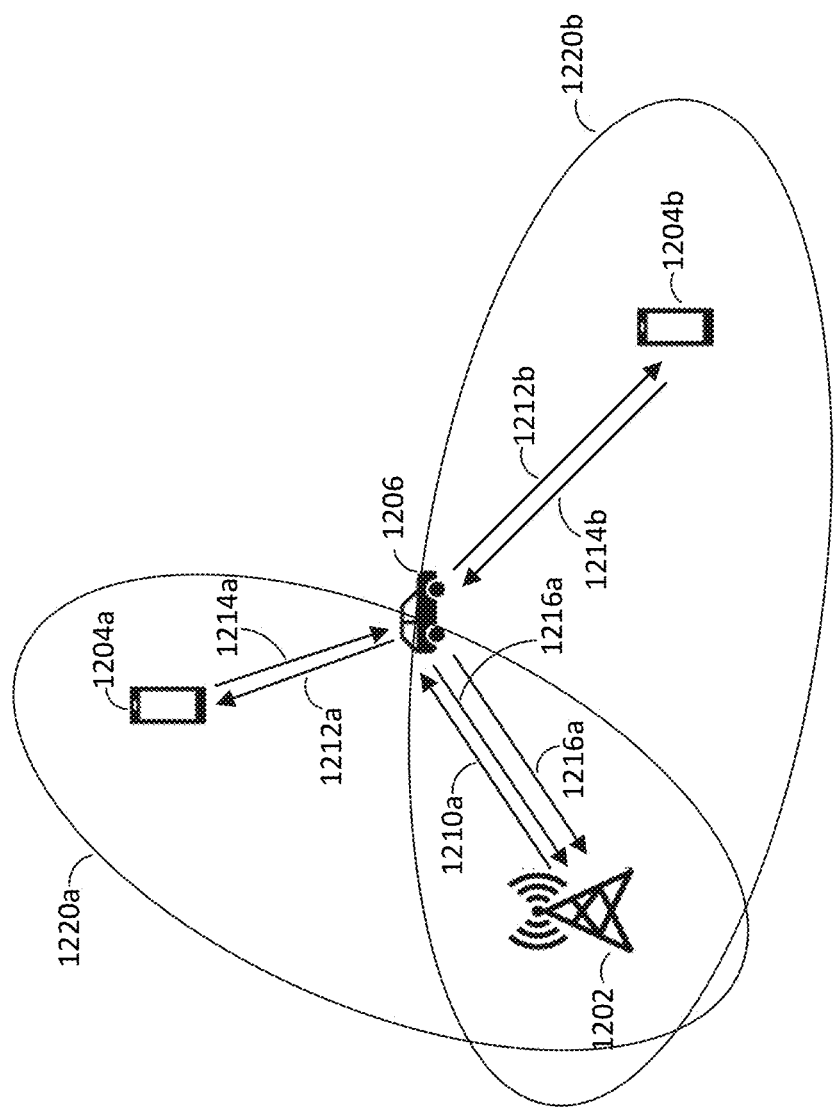
FIG. 12 is a diagram illustrating the computation of a target position as the intersection of multiple ellipsoids, without relying on a Line of Sight (LOS) signal, according to an aspect of the present disclosure.

According to some embodiments, the sensing server may compute the position of the target by finding the intersection of multiple ellipsoidal surfaces/curves, as described previously with respect to Eq. 1 and in subsequent discussions with respect to FIG. 12.

Figure 9:
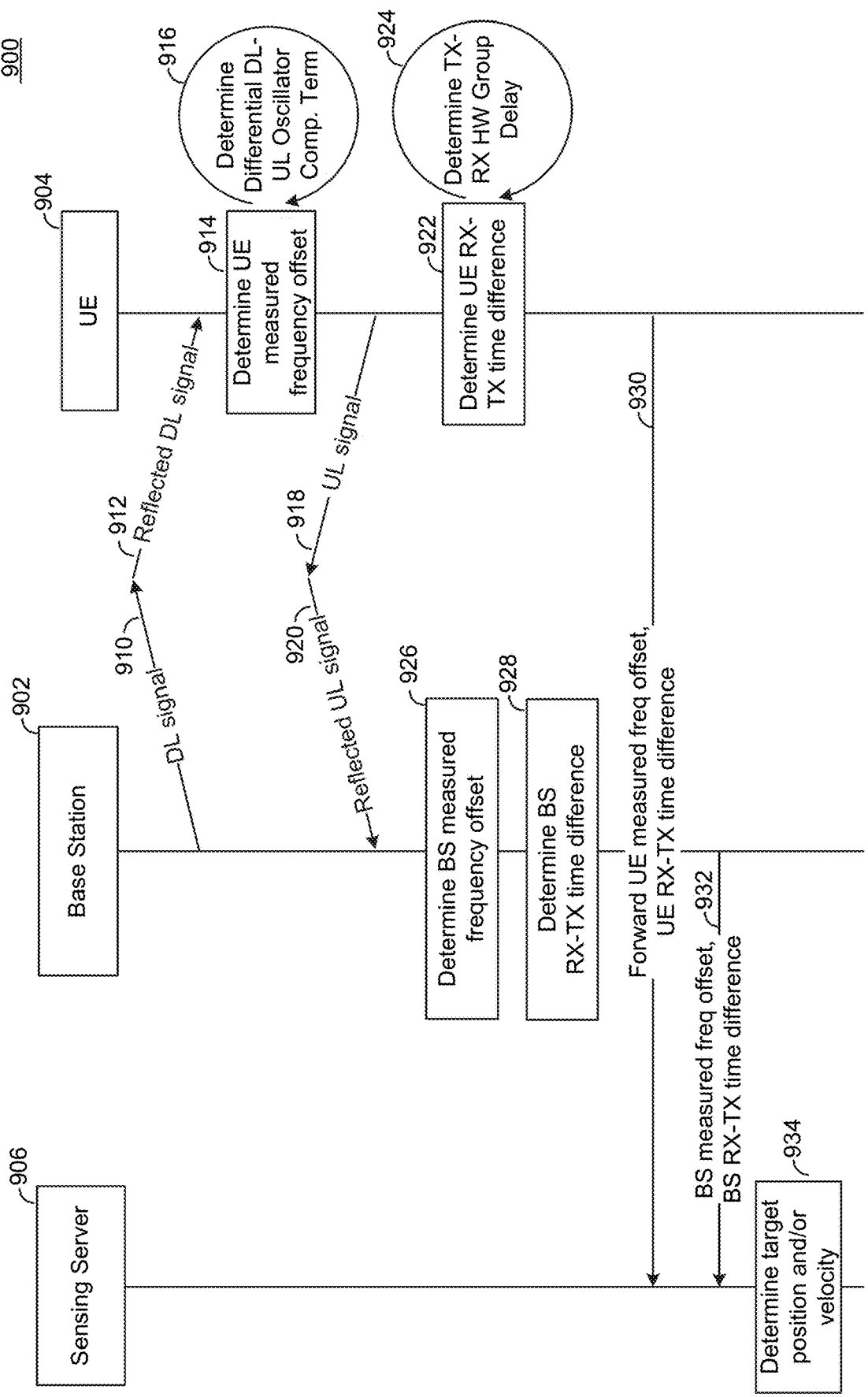
FIG. 9 is a signal flow diagram showing the transmission and reception of a DL signal and an UL signal, with RX-TX time difference and measured frequency offset being reported to a sensing server implemented in a server apart from the base station.

FIG. 9 is a signal flow diagram 900 showing the transmission and reception of a DL signal and an UL signal, with RX-TX time difference and measured frequency offset being reported to a sensing server implemented in a server apart from the base station. The operations shown in the signal flow diagram 900 represents another example of a generalized DL+UL based bistatic sensing scheme. Here, the sensing scheme involves a base station 902, a UE 904, and a sensing server 906 (e.g, radar server) that serves as a sensing server and is separated from the base station 902 (e.g., at a geographically different location). In other respects, the operations associated with the DL and UL signals used as radar signals is similar to those described previously with respect to flow diagram 800 in FIG. 8. The DL signal 910 may be transmitted in different ways, e.g., as a directional beam formed using an antenna array, as discussed previously, to reach a target (not shown). The DL signal 910 reflects off of the target to form a reflected signal 912. The UE 904 receives the reflected DL signal 912. The UE 904 may receive the reflected DL signal 912 in different ways, e.g., by using one or more receive directional beams formed using an antenna array, as discussed previously.

At 914, the UE 804 determines a UE measured frequency offset $f_{UE,measure}$ in connection with receiving the reflected DL signal 912. The UE 904 may be aware of the RF frequency $f_{DL}$ at which the reflected DL signal 912 is expected to be located (without taking into account Doppler effects and/or one or more oscillator offsets). The UE 904 is also capable of determining the RF frequency at which the reflected DL signal 912 is actually received. The UE 904 may determine the UE measured frequency offset $f_{UE,measure}$ as the difference between the RF frequency $f_{DL}$ at which the reflected DL signal 912 is expected to be located and the RF frequency at which the reflected DL signal 912 is actually received. Factors that may introduce shifts in the measured frequency of the reflected DL signal 912 upon reception include, for example, Doppler effects associated with the movement of the target, Doppler effects associated with the movement of the UE 904, and effects of an RX oscillator error or offset $f_{off\_DL}$ associated with an oscillator used in down-converting the reflected DL signal 912 at the UE 904 after reception. In this embodiment, the effects of oscillator errors at the base station may be ignored because they are relatively small given the more precise oscillator tuning available at the base station. Just as an example, the UE 904 may estimate the RF frequency at which the reflected DL signal 912 is actually received by combining a coarse RX frequency estimate (CFE) with a fine RX frequency estimate (FFE), in a similar manner as described previously.

In some embodiments, the UE is expected to compensate for a frequency offset caused by oscillator differences. For example, at 916, the UE 904 may determine a UE measured frequency offset that includes a differential DL-UL oscillator compensation term corresponding to a difference between a TX oscillator frequency error associated with the TX local oscillator and an RX oscillator frequency error associated with the RX local oscillator. In such embodiments, the UE 904 may down-convert the reflected DL signal 912 using a RX local oscillator and upconvert an uplink signal (described later) using a separate TX local oscillator. As a result, the normalized frequency offset $$\frac{f_{UE,measure}}{f_{DL}}$$

measured by the US and the normalized frequency offset $$\frac{f_{gNB,measure}}{f_{UL}}$$

measured by the base station can be shown to be represented by Equations 16 and 17, which is described previously.

By reporting a UE measured frequency offset $f_{UE,measure}$ that comprises a differential oscillator compensation term (e.g., "delta") corresponding to a difference between a TX oscillator frequency error associated with the TX local oscillator and an RX local oscillator frequency error associated with the RX local oscillator, the UE 904 ensures that shifts introduced by the difference between the TX oscillator frequency error and the RX oscillator frequency error can easily be cancelled at the sensing server, e.g., at the sensing server 906, in accordance with Equation 18.

For instance, the UE 904 may have characterized both the RX local oscillator and the TX local oscillator, e.g., by implementing a temperature compensation look-up table for the TX local oscillator and a temperature compensation look-up table for the RX local oscillator. Thus, the UE 904 is in control and aware of the temperature-based compensation implemented for both the RX oscillator and TX oscillator, including any frequency errors associated with each oscillator (e.g., before and/or after compensation). A difference between the TX oscillator frequency error associated with the TX local oscillator and the RX oscillator frequency error associated with the RX local oscillator may account for an additional shift in the UE measured frequency offset.

The UE 904 is responsible for estimating such a differential DL-UL oscillator compensation term and including it as part of the UE measured frequency offset $f_{UE,measure}$. Accordingly, the UE may facilitate computation of the target velocity (v) corresponding to the bistatic Doppler shift by averaging the normalized frequency offset $$\frac{f_{UE,measure}}{f_{DL}}$$

measured by the US and the normalized frequency offset $$\frac{f_{gNB,measure}}{f_{UL}}$$

measured by the base station, even when different local oscillators are used for down conversion of the received reflected DL signal and up conversion of the transmitted UL signal, e.g., according to Equation 19.

In other embodiments, the UE measured frequency offset $f_{UE,measure}$ comprises no oscillator compensation term (e.g., "delta"). For example, the UE 904 may do so by using the same local oscillator for down-converting the reflected DL signal 812 and upconvert an uplink signal (as opposed to using separate TX and RX local oscillators). In such embodiments, the target velocity (v) corresponding to the bistatic Doppler shift may be computed by averaging the normalized frequency offset $$\frac{f_{UE,measure}}{f_{DL}}$$

measured by the UE and the normalized frequency offset $$\frac{f_{gNB,measure}}{f_{UL}}$$

measured by the base station, e.g., as described in Eq. 13.

In the reverse direction, the UE 904 transmits an UL signal 918. The UL signal 918 may be transmitted in different ways, e.g., as a direction beam formed using an antenna array, as discussed previously, to reach the same target (now shown). The UL signal 918 reflects off of the target to form a reflected UL signal 920. The base station 902 receives the reflected UL signal 920. The base station 902 may receive the reflected UL signal 920 in different ways, e.g., by using one or more receive directional receive beams formed with an antenna array, as described previously.

At 922, the UE 904 determines a UE RX-TX time difference $T_{UE,RX\_TX}$, which may represent a time delay between the time at which the UE 904 receives the reflected DL signal 912 and the time at which the UE 904 transmits the UL signal 918. Such time delay may include one or more components. One component may be a UE TX-RX hardware group delay, which is determined at 924. The UE TX-RX hardware group delay may comprise (a) an RX group delay compensation term corresponding to the propagation delay of the reflected DL signal 912 through the receive circuitry at the UE 904 and (b) a TX group delay compensation term corresponding to propagation delay of the UL signal 918 through the transmit circuitry at the UE 904. For example, the RX and TX group delays associated the receive and transmit circuitry, respectively, of the UE 904 may be characterized (e.g., at time of manufacture) and stored as fixed values or in the form of a look-up table of values. If the propagation delays are temperature-dependent, a temperature value measured at the UE 904 using a temperature sensor may be used as an input to the look-up table to obtain the RX group delay and/or the TX group delay. Again, the order of the DL and UL signal transmissions can vary in different embodiments. The DL signal 910 may be transmitted before, after, or partially or fully during the transmission of the UL signal 918. The transmissions of the DL signal 910 and the UL signal 918 may be scheduled based on one or more resource element and may be scheduled to be relatively close in time, in order to place limits on the extent to which the target can move or change its velocity between the moment when the DL signal 910 reflects off of the target and the moment when the UL signal 918 reflects off of the target.

At 926, upon receiving the reflected UL signal 920, the base station 902 determines a base station (BS) measured frequency offset $f_{gNB,measure}$ in connection with receiving the reflected UL signal 920. The base station 902 may be aware of the RF frequency $f_{UL}$ at which the reflected UL signal 920 is expected to be located (without taking into account Doppler effects and/or one or more oscillator offsets). The base station 902 is also capable of determining the RF frequency at which the reflected UL signal 920 is actually received. The base station 902 may determine the BS measured frequency offset $f_{gNB,measure}$ as the difference between the RF frequency $f_{UL}$ at which the reflected UL signal 820 is expected to be located and the RF frequency at which the reflected UL signal 920 is actually received. Factors that may introduce shifts in the measured frequency of the reflected UL signal 920 upon reception include, for example, Doppler effects associated with the movement of the target, Doppler effects associated with the movement of the UE 904, and effects of a TX oscillator error or offset $f_{off\_UL}$ associated with an oscillator used in upconverting the UL signal 918 at the UE 904 before transmission. In this embodiment, the effects of oscillator errors at the base station may be ignored because they are relatively small given the more precise oscillator tuning available at the base station. The base station 902 may utilize a combination of analog/digital as well as hardware/software components to determine the RF frequency $f_{UL}$ at which the reflected UL signal 920 is actually received, e.g., by combining a coarse RX frequency estimate and a fine RX frequency estimate, in a manner similar to that described previously.

At 928, the base station 902 determines a base station RX-TX time difference $T_{gNB,RX\_TX}$, which may represent a time delay between the time at which the base station 902 transmits the DL signal 910 and the time at which the base station 902 receives the reflected UL signal 920. Such time delay may include one or more components. In some embodiments, the base station RX-TX time difference $T_{gNB,RX\_TX}$ constitutes a total round-trip time that comprises (1) the TX over-the-air propagation time for the DL signal 910 to travel from the base station 902 to the target and for the reflected DL signal 912 to travel from the target to the UE 904, (2) the UE RX-TX time difference $T_{UE,RX\_TX}$, and (3) the RX over-the-air propagation time for the UL signal 918 to travel from the UE 904 to the target and for the reflected UL signal 920 to travel from the target to the base station 902. In determining the base station RX-TX time difference $T_{gNB,RX\_TX}$, the base station 902 may take into account a base station TX-RX hardware group delay associated with the propagation of the DL signal 910 through the transmit circuitry and the propagation of the reflected UL signal through the receive analog circuitry at the base station 902. The base station TX-RX hardware group delay may be stored as one or more fixed values or obtained from a look-up table, e.g., indexed based on a temperature sensor input value.

At 930, the base station 902 forwards the UE measured frequency offset $f_{UE,measure}$ and the UE RX-TX time difference $T_{UE,RX\_TX}$ to the sensing server 906. For example, the values may be sent in an uplink data message from the UE 904 to the sensing server 906. Alternatively, the values may be sent in network message via a wired network from the UE 904 to the sensing server 906. In some embodiments, the UE associates each pair of RX-TX time difference and frequency offset values measured at the UE with a target identifier and a time stamp. For example, the UE 904 may forward the pair of values representing the UE RX-TX time difference $T_{UE,RX\_TX}$ and the UE measured frequency offset $f_{UE,measure}$, along with an associated target ID and a time stamp, to the sensing server 906.

At 932, the UE 904 forwards the BS measured frequency offset $f_{BS,measure}$ and the BS RX-TX time difference $T_{BS,RX\_TX}$ to the sensing server 906. For example, the values may be sent in an uplink data message from the base station 902 to the sensing server 906. Alternatively, the values may be sent in network message via a wired network from the base station 902 to the sensing server 906. In some embodiments, the base station associates each pair of RX-TX time difference and frequency offset values measured at the base station with a target identifier and a time stamp. For example, the base station 902 may associate the pair of values representing the base station RX-TX time difference $T_{gNB,RX\_TX}$ and the base station measured frequency offset $f_{gNB,measure}$ with an associated target ID and a time stamp. The base station may forward the pair of values with the associated target ID and time stamp to the sensing server 906.

At 934, the sensing server 906 may determine the position and/or velocity of the target. Computations of the position and/or velocity of the target may be based on measurements such as the UE measured frequency offset $f_{UE,measure}$ and the UE RX-TX time difference $T_{UE,RX\_TX}$ forwarded by the UE 904, as well as the BS measured frequency offset $f_{gNB,measure}$ and the base station RX-TX time difference $T_{gNB,RX\_TX}$ measured by the base station 902. For example, the sensing server may compute the velocity (v) of the target by averaging the normalized frequency offset measured by the UE and the normalized frequency offset measured by the base station. This may be done in accordance with Eq. 13 (in the case of using the same local oscillator for RX and TX at the UE 904) or Eq. 19 (in the case of using separate RX local oscillator and TX local oscillator at the UE 904). The sensing server 906 may compute the position of the target in various ways. For example, using the target ID and time stamp mentioned above, sensing server 906 may keep track of numerous pairs of RX-TX time difference and frequency offset values received by the base station 902 regarding one or more targets, to perform bistatic radar measurements involving multiple UEs and/or multiple targets (e.g., as described later with respect to FIGS. 10 and 12).

Figure 10:
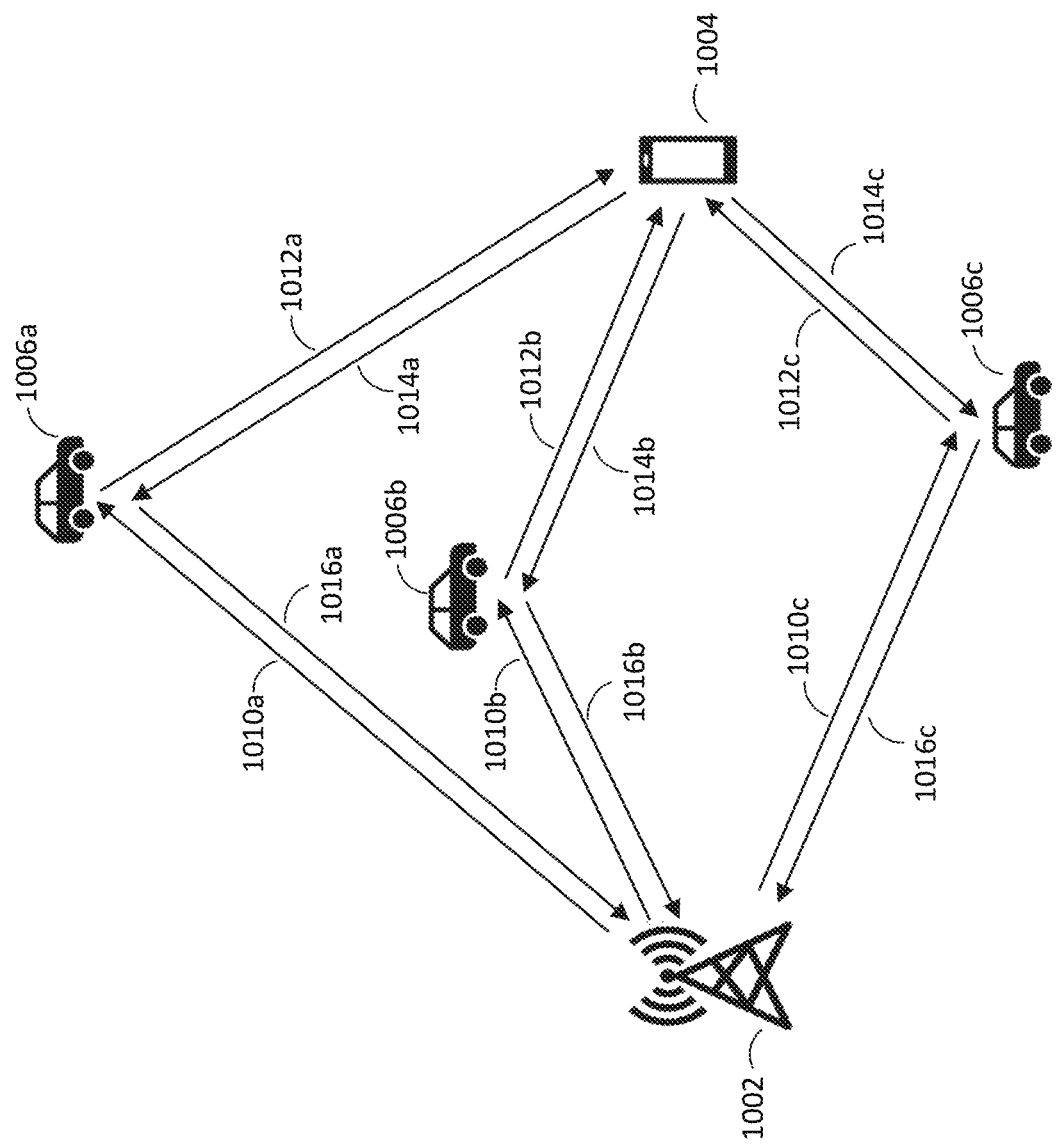
FIG. 10 is a diagram showing an example DL signals and UL signals used for bistatic radar measurements involving multiple targets, according to an aspect of the disclosure.

FIG. 10 is a diagram showing downlink (DL) signals and uplink (UL) signals used for bistatic radar measurements involving multiple targets, according to an aspect of the disclosure. Generally speaking, bistatic and multi-static radar operations according to various embodiments of the present disclosure can involve one or more base stations, one or more UE, and one or more pairs of DL+UL signals. As shown in FIG. 10, a particular pair of base station and UE, e.g., base station 1002 and UE 1004, can transmit and receive DL and UL signals involving reflections off of multiple targets, e.g., targets 1006a, 1006b, and 1006c. The base station 1002 may transmit a DL signal 1010a toward target 1006a, a DL signal 1010b toward target 1006b, and a DL signal 1010c toward target 1006c. In some embodiments, the DL signals 1010a, 1010b, and 1010c may be transmitted together, as parts of the same beam, e.g., a single-lobe beam having a beam profile that is sufficiently expansive to reach targets 1006a. 1006b, and 1006c, or a beam with multiple lobes that reach targets 1006a, 1006b, and 1006c. Alternatively, the DL signals 1010a, 1010b, and 1010c may be transmitted as separate beams. The DL signals 1010a, 1010b, and 1010c may be transmitted simultaneously or at different times. The DL signals 1010a. 1010b, and 1010c reach and reflect off of targets 1006a. 1006b, and 1006c to form reflected DL signals 1012a, 1012b, and 1012, respectively. The reflected DL signals are received by the UE 1004.

In the reverse direction, the UE 1004 may transmit an UL signal 1014a toward target 1006a, an UL signal 1014b toward target 1006b, and an UL signal 1014c toward target 1006c. In some embodiments, the UL signals 1014a, 1014b, and 1014c may be transmitted together, as parts of the same beam, e.g., a single-lobe beam having a beam profile that is sufficiently expansive to reach targets 1006a, 1006b, and 1006c, or a beam with multiple lobes that reach targets 1006a, 1006b, and 1006c. Alternatively, the UL signals 1014a, 1014b, and 1014c may be transmitted as separate beams. The UL signals 1014a. 1014b, and 1014c may be transmitted simultaneously or at different times. The UL signals 1014a. 1014b, and 1014c reach and reflect off of targets 1006a, 1006b, and 1006c to form reflected UL signals 1016a, 1016b, and 1016c, respectively. The reflected UL signals are received by the base station 1002. The use of each pair of DL+UL signals to determine position and/or velocity for a target may involve the steps described in previous and subsequent sections.

For illustrative purposes, FIG. 10 shows DL+UL signals being sent and received by one base station 1002 and one UE 1004, with signal reflections off of multiple targets 1014a, 1014b, and 1014c. That is, the DL and UL signals being transmitted and received by a particular pair of base station and UE may be used to determine the positions and/or velocities of multiple targets. While not explicitly shown in FIG. 10, the determination of the position and/or velocity of any particular target may involve DL and UL signals being transmitted and received by one or more base stations and one or more UEs.

Figure 11:
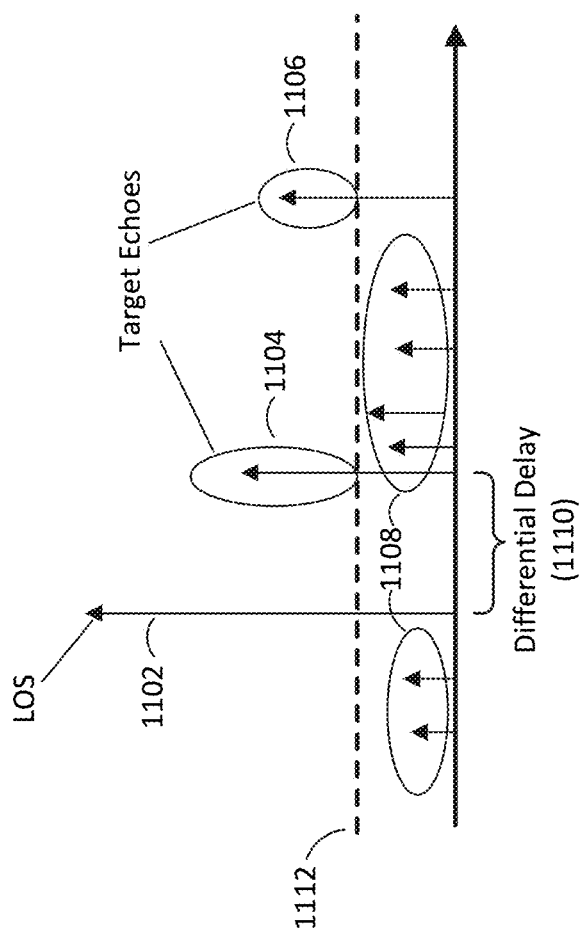
FIG. 11 illustrates the timing of reflected signals from multiple targets received by a receiver in connection with bistatic radar operations.

FIG. 11 illustrates the timing of reflected signals from multiple targets received by a receiver in connection with bistatic radar operations. A UE or a base station involved in DL+UL radar operations may receive different kinds of signals, such as a line of sight (LOS) signal 1102, target echo signals such as signals 1104 and 1106, and noise and/or multi-path signals 1108. The signals shown in FIG. 11 may represent DL or UL signals. Taking DL signals as an example, a base station may transmit a DL signal toward multiple targets. The DL signal may reflect off of the multiple targets to form reflected DL signals—e.g., target echo signals 1104 and 1106. The UE may receive the LOS 1102 and the target echo signals 1104 and 1106. Taking ULL signals as an example, a UE may transmit an UL signal toward multiple targets. The UL signal may reflect off of the multiple targets to form reflected UL signals—e.g., target echo signals 1104 and 1106. The base station may receive the LOS 1102 and the target echo signals 1104 and 1106. According different embodiments of the disclosure, the LOS signal 1102 may or may not be used to determine the position of one or more of the targets, depending on implementation.

As shown in FIG. 11, the LOS signal 1102 is expected to arrive at the receive before any target echo signals. This is because the LOS 1102 signal represents the direct and thus shortest path between the transmitter and the receiver. Each of the echo signals 1104 and 1106 reflects off of a target and thus takes a longer, reflected path to travel from the transmitter to the receiver. Thus a differential delay 1110 may be observed at the receiver between the arrival of the LOS signal 1102 and the arrival of the first target echo signal 1104. Depending on the relative positions of the transmitter, receiver, and targets, each target echo signal may arrive at the receiver at particular amount of delay associated with the length of the reflected signal path taken by that specific target echo signal.

The receiver, be it a base station or a UE, may take into account one or more factors to differentiate the various signals shown in FIG. 11. In one embodiment, the receiver utilizes one or more signal strength thresholds to classify signals. For example, the receiver may use a signal strength threshold 1112 to distinguish between the LOS signal 1102 and reflected signals versus noise and/or multipath signals 1108. Signals having a signal strength meeting or exceeding the signal strength threshold 1112 may be classified as LOS or target echo signals. Signals having a signal strength below the signal strength threshold 1112 may be classified as noise and/or multipath signals. The first signal meeting or exceeding the signal strength threshold 1112 may be deemed to be the LOS signal. In some instances, an LOS signal may not be received (e.g., a line-of-sight path between the transmitter and the receiver may be obstructed). Thus, a second signal strength threshold (not explicitly shown in FIG. 11) may be established. A signal that meets or exceeds the second signal strength threshold may be deemed to be the LOS, while signals having signal strengths below the second signal strength threshold may be deemed to be target echo signals. A combination of relative signal strengths and/or order of signal reception may also be used.

FIG. 12 is a diagram illustrating the computation of a target position as the intersection of multiple ellipsoids, without relying on a Line of Sight (LOS) signal, according to an aspect of the present disclosure. The transmission and reception of DL+UL signals can generate a total distance estimate $R_{sum}=R_T+R_R$, according to Equation 1. The total distance $R_{sum}$ corresponds to the total distance of the reflected signal path, from the base station to the target and from the target to the UE (or vice versa, from the UE to the target and from the target to the base station). As discussed previously and referring back to FIG. 5, the total distance $R_{sum}$ defines an ellipsoid surface (also known as the iso-range contour) with foci at the locations of the transmitter 502 and the receiver 504, respectively. The resulting ellipsoid surface represents all possible locations of the target 506. Multiple instances of DL+UL signal transmission/reception involving different base station/UE pairs can be performed to generate multiple, distinct ellipsoid surfaces for a particular target. The intersection of the multiple, distinct ellipsoid surfaces may be determined as the position of the target.

According to some embodiments of the disclosure, the transmission and reception of each DL+UL signal pair generates the timing information for determining a total distance $R_{sum}=R_T+R_R$, without relying on the reception of an LOS signal and without the need for tight time synchronization between the transmitter (e.g., base station or UE) and the receiver (e.g., UE or base station). Just as an example, a base station such as base station 602, base station 802, base station 902, or base station 1002 may send a DL signal, which is reflected off of a target to form a reflected DL signal. A UE such as UE 604, UE 804, UE 904, or UE 1004 may receive the reflected DL signal. In response, the UE may send an UL signal, which is reflected off of the target to form a reflected UL signal. The base station then receives the reflected UL signal. In this process, the UE determines a UE RX-TX time difference $T_{UE,RX\_TX}$ and forwards it to the sensing server (within the base station or at a server separate from the base station). The base station determines a base station RX-TX time difference $T_{gNB, RX\_TX}$ and forwards it to the sensing server (within the base station or at the server separate from the base station). As discussed previously, the UE RX-TX time difference $T_{UE,RX\_TX}$ may represent a time delay between the time at which the UE receives the reflected DL signal and the time at which the UE transmits the UL signal. The base station RX-TX time difference $T_{gNB,RX\_TX}$ may represent a time delay between the time at which the base station transmits the DL signal and the time at which the base station receives the reflected UL signal. The UE RX-TX time difference $T_{UE,RX\_TX}$ and the base station RX-TX time difference $T_{gNB,RX\_TX}$ as provide by the UE and the base station, respectively, may be adjusted to compensate for any hardware group delays.

The sensing server may determine the total time duration $T_{sum}$ between moment when the base station sends the DL signal and moment when the UE receives the reflected DL signal (or the moment when the when the UE sends the UL signal and the moment when the base station receives the reflected UL signal), based on the difference between the base station RX-TX time difference $T_{gNB, RX\_TX}$ and the UE RX-TX time difference $T_{UE,RX\_TX}$:

$$T_{SUM} = \frac{T_{gNB,RX\_TX} - T_{UE,RX\_TX}}{2} \quad \text{(Eq. 20)}$$

Alternatively, the UE may first send the UL signal, and the base station may receive the reflected UL signal. In response, the base station may send the DL signal, and the UE may receive the reflected DL signal. In such an implementation, the total time duration $T_{sum}$ can be determined in a similar fashion, but with a slightly modified equation:

$$T_{SUM} = \frac{T_{UE,RX\_TX} - T_{gNB,RX\_TX}}{2} \quad \text{(Eq. 21)}$$

The sensing server may then determine the total distance $R_{sum}$ by multiplying the time duration $T_{sum}$ by the speed of the signal through free space, e.g., approximately $c=3*10^8$ meters/second, as discussed previously. The total distance $R_{sum}$, based on the transmission and reception of a DL+UL signal pair, can thus be determined. The sensing server determines the possible locations of the target as the ellipsoid surface defined by the total distance $R_{sum}$, with foci positioned at the locations of the base station and the UE.

Referring to FIG. 12, the process described above may be repeated for multiple DL+UL signal pairs, to generate multiple ellipsoid surfaces. For example, a base station 1202 and a UE 1204*a* may transmit and receive a first pair of DL+UL signals that reflect off of a target 1206 to generate a first total distance $R_{sum}$ and define a first ellipsoid surface 1220*a*. Similarly, the base station 1202 and a different UE 1204*b* may transmit and receive a second pair of DL+UL signals that reflect off of the target 1206 to generate a second total distance $R_{sum}$ and define a second ellipsoid surface 1220*b*. Additional ellipsoid surfaces (not explicitly shown in FIG. 12) may be determined in a similar manner to narrow down the number of possible positions (i.e., number of intersections of ellipsoid surfaces) to a specific position estimate for the target 1206. The sensing server may determine the intersection of the first ellipsoid surface 1220*a* and the second ellipsoid surface 1220*b* (and additional ellipsoid surfaces, if needed) as the estimate of the position of the target 1206.

In the DL+UL signaling process described herein, DL and/or UL signals may be "re-used." For instance, in the example described above, the first pair of DL+UL signals comprise (1) a first DL signal 1210*a* sent from the base station 1202, reflected off of the target 1206 as a reflected DL signal 1212*a*, and received by the first UE 1204*a* and (2) a first UL signal 1214*a* sent from the UE 1204*a*, reflected off of the target 1206 as a reflected UL signal 1216*a*, and received by the base station 1202. The second pair of DL+UL signals comprise (a) the same first DS signal 1210*a* sent from the base station 1202, reflected off of the target 1206 as a reflected DL signal 1212*b*, and received by the second UE 1204*b* and (2) a second UL signal 1214*b* sent from the second UE 1204*b*, reflected off of the target 1206 as a reflected UL signal 1216*b*, and received by the base station 1202. Here, the same DL signal 12010*a* is used as part of the first DL+UL signal pair and "re-used" as part of the second DL+UL signal pair.

Figure 13:
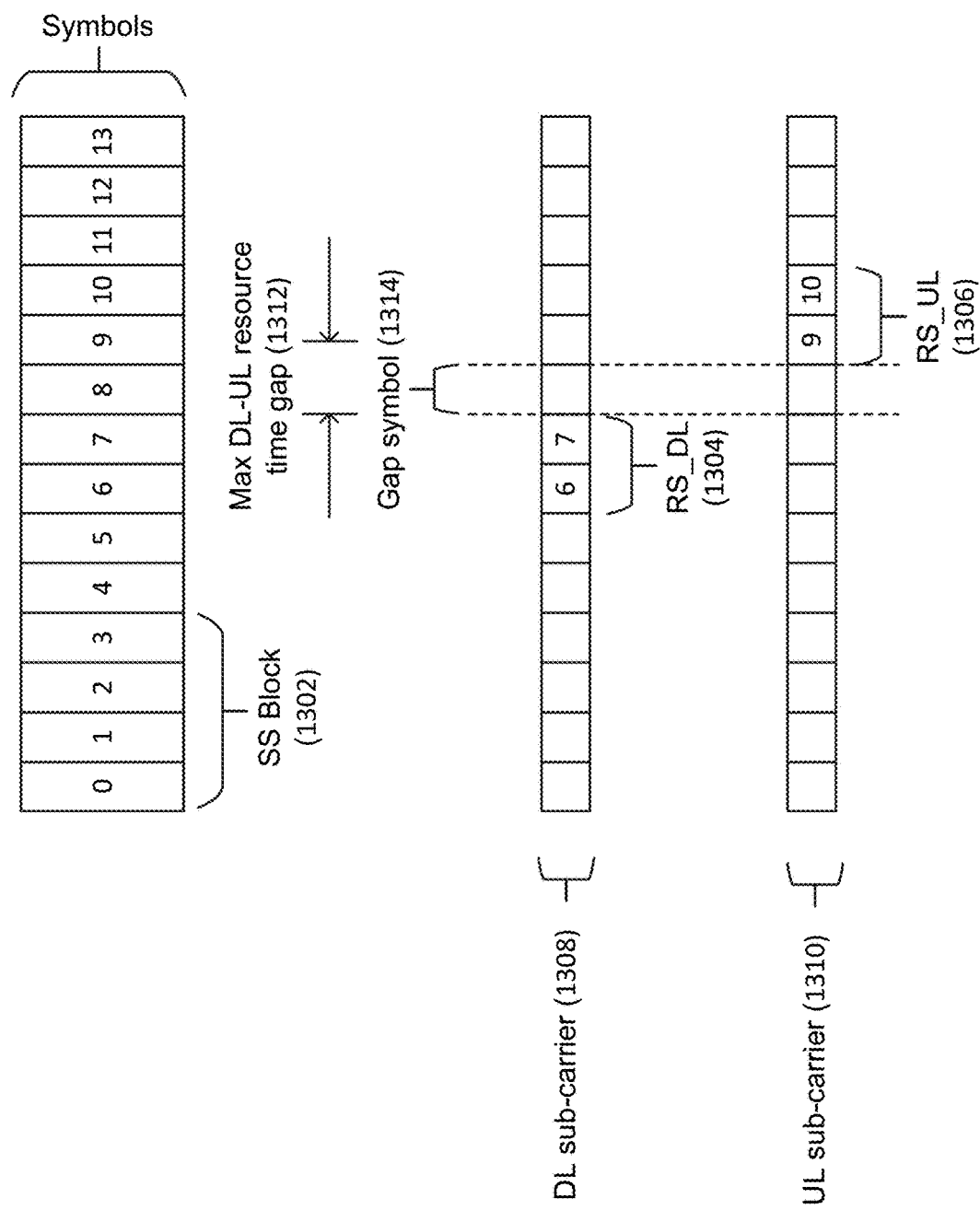
FIG. 13 shows examples of downlink and uplink resources designated for supporting DL and UL based bistatic sensing, in the context of an NR frame structure.

FIG. 13 shows examples of downlink and uplink resources designated for supporting DL and UL based bistatic sensing, in the context of an NR frame structure. According to embodiments of the present disclosure, a downlink signal and an uplink signal may be transmitted at different times in a time-division duplexing (TDD) system, at different frequencies in a frequency-division duplexing (FDD) system, or at different combinations of times and/or frequencies representing different resources within a time-based and frequency-based multiple access system. For instance, the various DL and UL signals discussed herein may be scheduled in a signal resource structure, such as an NR frame structure. As discussed previously with reference to FIG. 4, the transmission timelines for downlink and uplink signals may be partitioned into units of radio frames. Each radio frame may have a predetermined duration (e.g., 10 ms) and may be partitioned into 10 subframes, each of 1 ms, with indices of 0 through 9. The radio frames may be defined for different carriers and sub-carriers within each carrier. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices.

According to various embodiments, the downlink signal is transmitted over one or more downlink resources, and the uplink signal is transmitted over one or more uplink resources. Each resource may comprise a resource element—e.g., a symbol period on a particular sub-carrier. Here, an example of a slot 1300 within an NR frame structure is shown. The slot 1300 may be designated as a sensing slot that includes at least one downlink resource and at least one uplink resource provided to support DL and UL sensing. Here, the slot 1300 comprises 14 symbol periods, which are labeled as symbols 0-13. In this particular example, one or more synchronization signals are scheduled to be transmitted in a synchronization signal block (SS Block) 1302, which occupy symbol periods 0-3. A downlink reference signal (RS_DL) 1304 is scheduled to be transmitted over two resource elements, e.g., symbol periods 6 and 7 on a downlink sub-carrier 1308. The downlink sub-carrier 1308 may be a sub-carrier of a downlink carrier in the NR frame structure. An uplink reference signal (RS_UL) 1306 is scheduled to be transmitted over two other resource elements, e.g., symbol periods 9 and 10 on an uplink sub-carrier 1310. The uplink sub-carrier 1310 may be a sub-carrier of an uplink carrier in the NR frame structure. According to some embodiments, each DL signal or UL signal is transmitted over two or more symbol periods to facilitate frequency measurement or frequency offset measurement (at the UE or the base station) based on phase estimation performed for at least two different symbols. For example, a change of the phase of an OFDM signal over time (e.g., over two different symbols) can provide an indication of the frequency or frequency offset in the OFDM signal.

In some embodiments, the UE identifies two or more downlink resources, from the one or more downlink resources over which the downlink reference signal is transmitted, as resources over which the UE measured frequency offset is obtained. The UE may provide such identification as part of reporting the UE measured frequency offset to the sensing server. For example, the UE may identify symbol periods 6 and 7 on downlink sub-carrier 1308 as two downlink resources over which the UE measured frequency offset is obtained. Similarly, the base station may identify two or more uplink resource, from the one or more uplink resources over which the uplink reference signal is transmitted, as resources over which the BS measured frequency offset is obtained. The base station may provide such identification as part of reporting the base station measured frequency offset to the sensing server. For example, the base station may identify symbol periods 9 and 10 on the uplink sub-carrier 1310 as two uplink resources over which the base station measured frequency offset is obtained. The sensing server, which may be implemented at the base station or at a server apart from the base station, may receive the reported identification of the resources over which the uplink and/or downlink frequency offsets are obtained and use such information to determine various parameters/values, such as the quality of the frequency offset measurements, the spacing in time and frequency between frequency offset measurements, the scheduling of the next downlink and uplink frequency offset measurements, etc., to facility more adaptive and more efficient sensing operations.

In some embodiments, the UE identifies a downlink resource and an uplink resource, from the one or more downlink resources and the one or more uplink resources, as a pair of DL/UL resources over which the UE RX-TX time difference is obtained. The UE may provide such identification as part of reporting the UE RX-TX time difference to the sensing server. For example, the UE may identify symbol periods 6 and 7 on downlink sub-carrier 1308 and symbol periods 9 and 10 on uplink sub-carrier 1310 as the pair of DL/UL resources over which the UE RX-TX time difference is obtained. The sensing server, which may be implemented at the base station or at a server apart from the base station, may receive the reported identification of the pair of DL/UL resources over which the UE RX-TX time difference is obtained and use such information to determine various parameters/values, such as the quality of the time difference measurement, the spacing in time between downlink and uplink portions of the time difference measurement, the scheduling of the next downlink and uplink signals for time difference measurement, etc., to facility more adaptive and more efficient sensing operations.

Referring to FIG. 13, according to some embodiments, a maximum DL-UL resource time gap 1312 may be defined, to specify an upper limit to the amount of time separation that is allowed to exist between the downlink resource and the uplink resource in the pair of DL/UL resources over which the UE RX-TX time difference is obtained. Here, the downlink reference signal (RS_DL) 1304 is separated from the uplink reference signal (RS_UL) 1306 by a time duration less than or equal to the specified maximum time gap parameter, i.e., maximum DL-UL resource time gap 1312. Specifically, a gap symbol 1314 is identified between the downlink reference signal (RS_DL) 1304 and the uplink reference signal (RS_UL) 1306, to ensure adherence to the maximum DL-UL resource time gap 1312 requirement.

Figure 14:
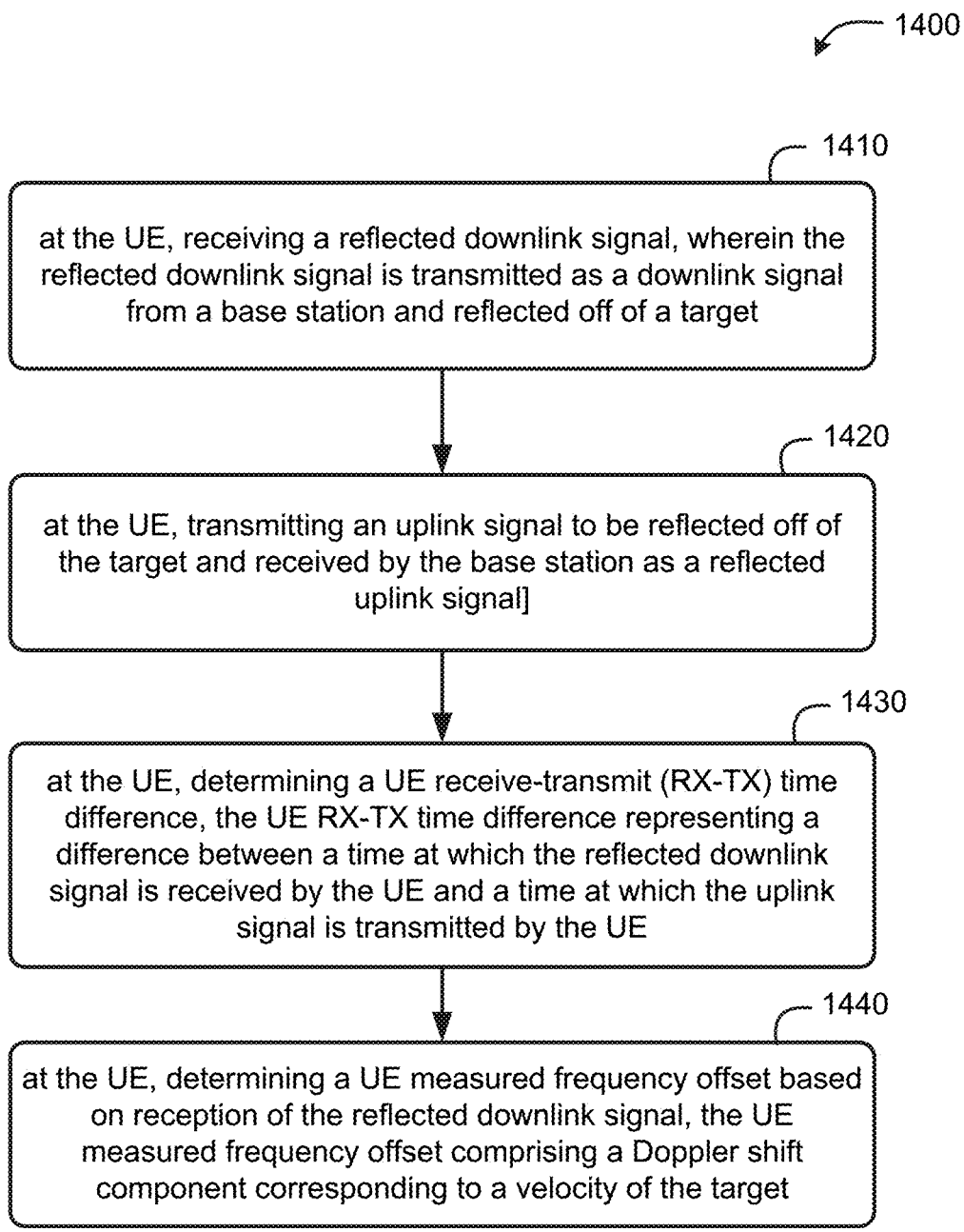
FIG. 14 illustrates a process performed at a UE for supporting one or more RF sensing measurements.
Figure 17:
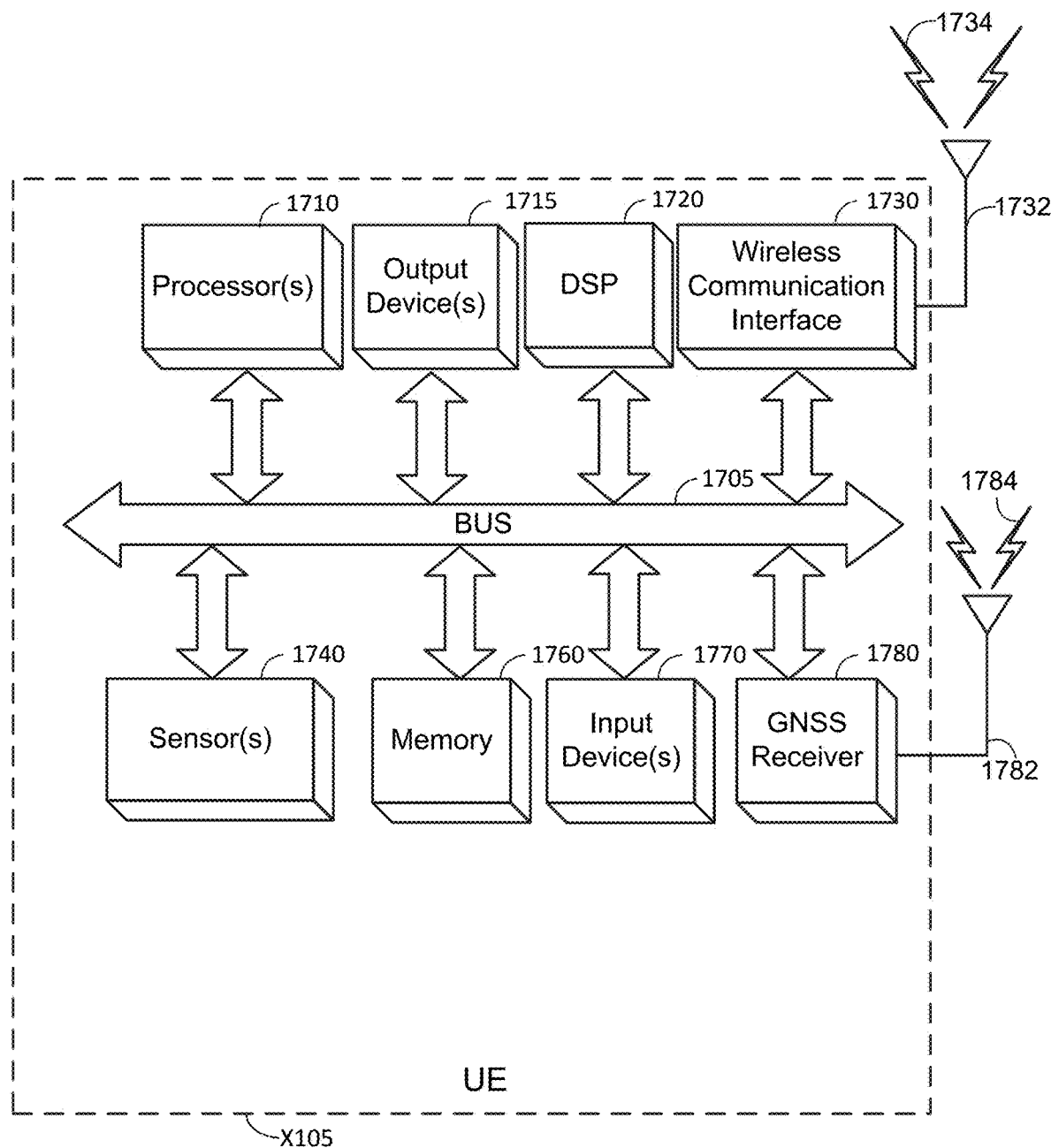
FIG. 17 is a block diagram of an embodiment of a UE, which can be utilized in embodiments as described herein.

FIG. 14 illustrates a process 1400 performed at a UE for supporting one or more RF sensing measurements. Means for performing the functionality illustrated in one or more of the blocks shown in FIG. 14 may be performed by hardware and/or software components of a UE are illustrated in FIG. 17, which is described in more detail below. At block 1410, the functionality comprises, at the UE, receiving a reflected downlink signal, wherein the reflected downlink signal is transmitted as a downlink signal from a base station and reflected off of a target. At block 1420, the functionality comprises, at the UE, transmitting an uplink signal to be reflected off of the target and received by the base station as a reflected uplink signal. At block 1430, the functionality comprises, at the UE, determining a UE receive-transmit (RX-TX) time difference, the UE RX-TX time difference representing a difference between a time at which the reflected downlink signal is received by the UE and a time at which the uplink signal is transmitted by the UE. At block 1440, the functionality comprises, at the UE, determining a UE measured frequency offset based on reception of the reflected downlink signal, the UE measured frequency offset comprising a Doppler shift component corresponding to a velocity of the target. The UE RX-TX time difference and the UE measured frequency offset, along with a base station RX-TX time difference and a base station measured frequency offset, may support computation of a position estimate and a velocity estimate for the target. For example, the UE may report the UE RX-TX time difference and the UE measured frequency offset to a sensing server. The sensing server may also receive the base station RX-TX time difference and the base station measured frequency offset. Based on these values, the sensing server may compute the position estimate and the velocity estimate for the target.

Figure 15:
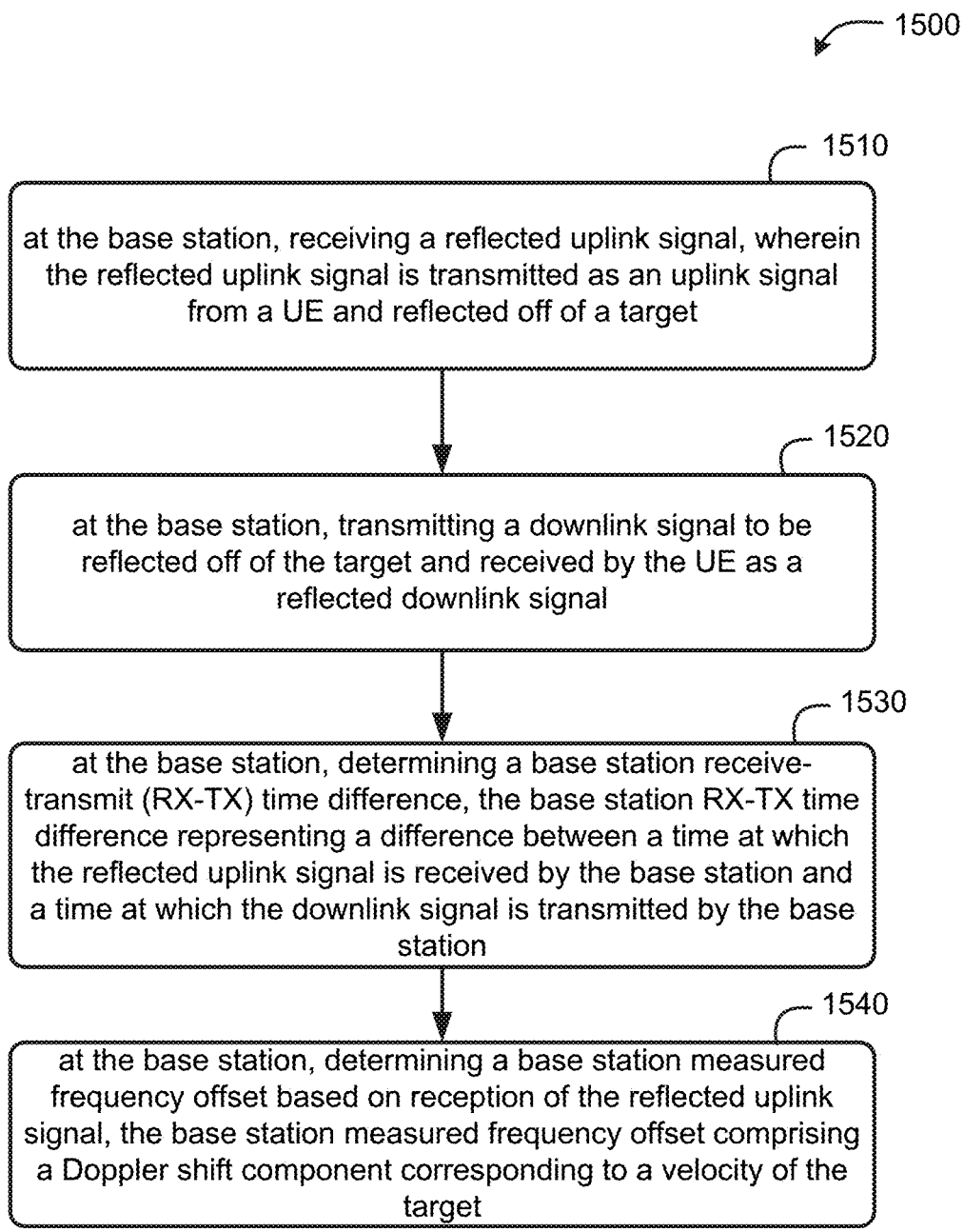
FIG. 15 illustrates a process performed at a base station for supporting one or more RF sensing measurements.
Figure 18:
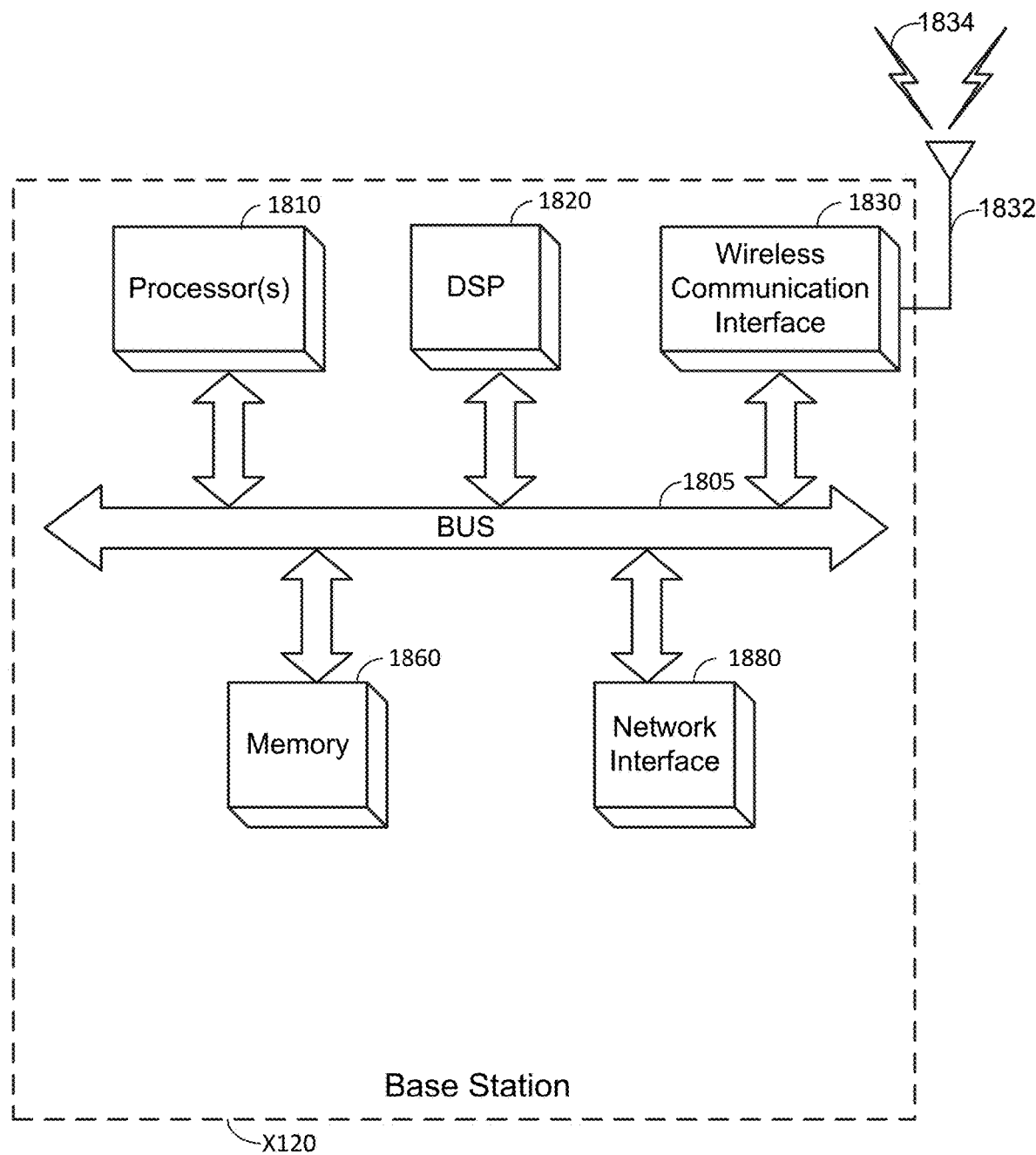
FIG. 18 is a block diagram of an embodiment of a base station, which can be utilized in embodiments as described herein.

FIG. 15 illustrates a process 1500 performed at a base station for supporting one or more RF sensing measurements. Means for performing the functionality illustrated in one or more of the blocks shown in FIG. 15 may be performed by hardware and/or software components of a base station are illustrated in FIG. 18, which is described in more detail below. At block 1510, the functionality comprises, at the base station, receiving a reflected uplink signal, wherein the reflected uplink signal is transmitted as an uplink signal from a UE and reflected off of a target. At block 1520, the functionality comprises, at the base station, transmitting a downlink signal to be reflected off of the target and received by the UE as a reflected downlink signal. At block 1530, the functionality comprises, at the base station, determining a base station receive-transmit (RX-TX) time difference, the base station RX-TX time difference representing a difference between a time at which the reflected uplink signal is received by the base station and a time at which the downlink signal is transmitted by the base station. At block 1540, the functionality comprises, at the base station, determining a base station measured frequency offset based on reception of the reflected uplink signal, the base station measured frequency offset comprising a Doppler shift component corresponding to a velocity of the target. The base station RX-TX time difference and the base station measured frequency offset, along with a UE RX-TX time difference and a UE measured frequency offset, may support computation of a position estimate and a velocity estimate for the target. For example, the base station may report the base station RX-TX time difference and the base station measured frequency offset to a sensing server. The sensing server may also receive the UE RX-TX time difference and the UE measured frequency offset. Based on these values, the sensing server may compute the position estimate and the velocity estimate for the target.

Figure 16:
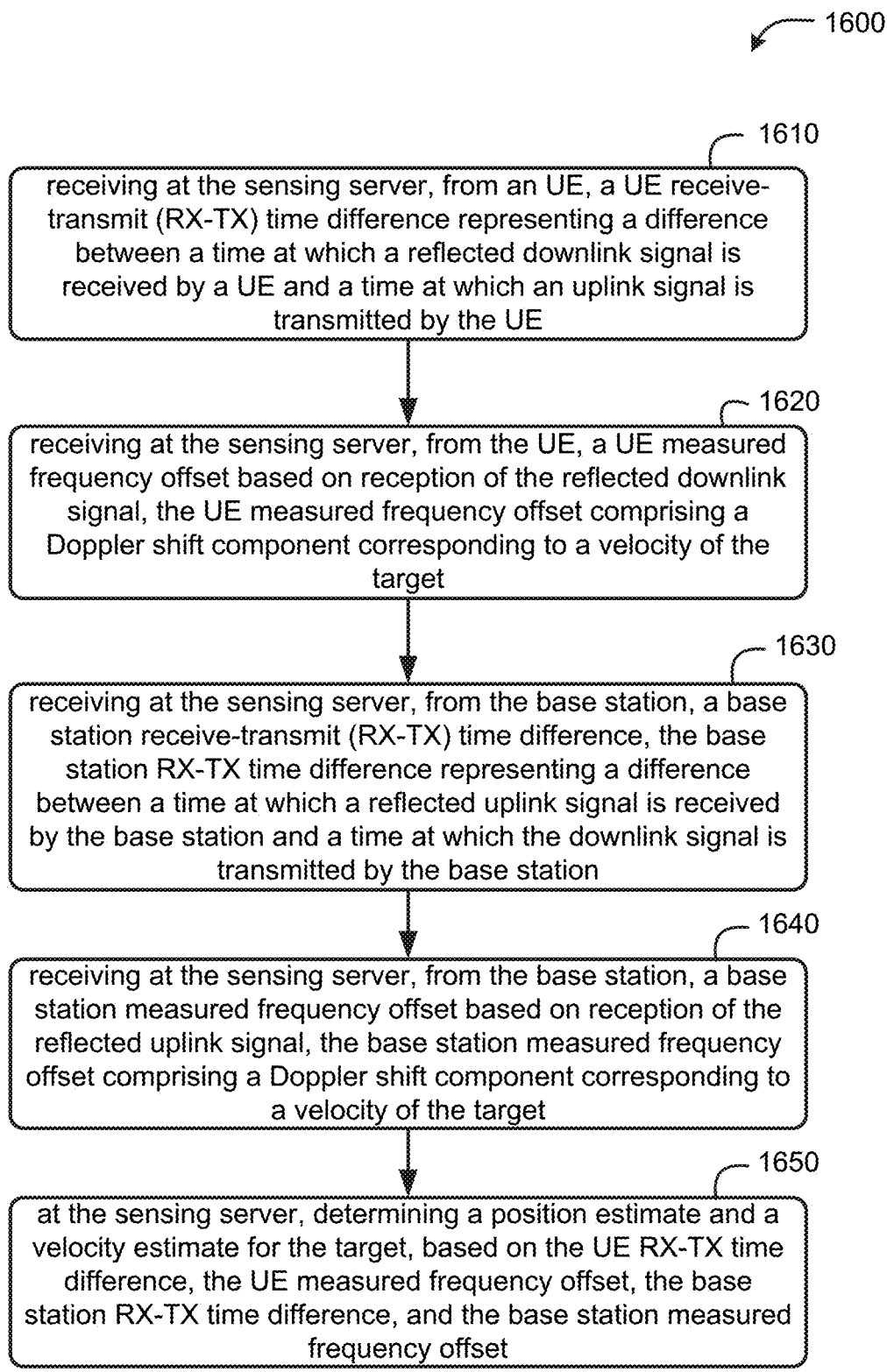
FIG. 16 illustrates a process performed at a sensing server for supporting one or more RF sensing measurements.

FIG. 16 illustrates a process 1600 performed at a sensing server for supporting one or more RF sensing measurements. Means for performing the functionality illustrated in one or more of the blocks shown in FIG. 16 may be performed by hardware and/or software components of a base station are illustrated in FIG. 18 or hardware and/or software components of a server implemented apart from a base station, such as a computer system illustrated in FIG. 19, which are described in more detail below. At block 1610, the functionality comprises, receiving at the sensing server, from an UE, a UE receive-transmit (RX-TX) time difference representing a difference between a time at which a reflected downlink signal is received by a UE and a time at which an uplink signal is transmitted by the UE. The reflected downlink signal may be transmitted as a downlink signal from a base station and reflected off of a target. At block 1620, the functionality comprises, receiving at the sensing server, from the UE, a UE measured frequency offset based on reception of the reflected downlink signal, the UE measured frequency offset comprising a Doppler shift component corresponding to a velocity of the target. At block 1630, the functionality comprises, receiving at the sensing server, from the base station, a base station receive-transmit (RX-TX) time difference, the base station RX-TX time difference representing a difference between a time at which a reflected uplink signal is received by the base station and a time at which the downlink signal is transmitted by the base station. The reflected uplink signal may be transmitted as an uplink signal from the UE and reflected off of the target. At block 1640, the functionality comprises, receiving at the sensing server, from the base station, a base station measured frequency offset based on reception of the reflected uplink signal, the base station measured frequency offset comprising a Doppler shift component corresponding to a velocity of the target. At block 1650, the functionality comprises, at the sensing server, determining a position estimate and a velocity estimate for the target, based on the UE RX-TX time difference, the UE measured frequency offset, the base station RX-TX time difference, and the base station measured frequency offset.

FIG. 17 is a block diagram of an embodiment of a UE 105, which can be utilized as described herein above (e.g., in association with FIGS. [insert figure numbers that describe/use a UE]). For example, the UE 105 can perform one or more of the functions of the method shown in FIG. [insert the figure number of flow diagram for method performed by UE, e.g., FIG. 10]. It should be noted that FIG. 17 is meant only to provide a generalized illustration of various components, any or all of which may be utilized as appropriate. It can be noted that, in some instances, components illustrated by FIG. 17 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 17.

The UE 105 is shown comprising hardware elements that can be electrically coupled via a bus 1705 (or may otherwise be in communication, as appropriate). The hardware elements may include a processor(s) 1710 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1710 may comprise one or more processing units, which may be housed in a single integrated circuit (IC) or multiple ICs. As shown in FIG. 17, some embodiments may have a separate DSP 1720, depending on desired functionality. Location determination and/or other determinations based on wireless communication may be provided in the processor(s) 1710 and/or wireless communication interface 1730 (discussed below). The UE 105 also can include one or more input devices 1770, which can include without limitation one or more keyboards, touch screens, touch pads, microphones, buttons, dials, switches, and/or the like; and one or more output devices 1715, which can include without limitation one or more displays (e.g., touch screens), light emitting diodes (LEDs), speakers, and/or the like.

The UE 105 may also include a wireless communication interface 1730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1730 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1732 that send and/or receive wireless signals 1734. According to some embodiments, the wireless communication antenna(s) 1732 may comprise a plurality of discrete antennas, antenna arrays, or any combination thereof. The antenna(s) 1732 may be capable of transmitting and receiving wireless signals using beams (e.g., Tx beams and Rx beams). Beam formation may be performed using digital and/or analog beam formation techniques, with respective digital and/or analog circuitry. The wireless communication interface 1730 may include such circuitry.

Depending on desired functionality, the wireless communication interface 1730 may comprise a separate receiver and transmitter, or any combination of transceivers, transmitters, and/or receivers to communicate with base stations (e.g., ng-cNBs and gNBs) and other terrestrial transceivers, such as wireless devices and access points. The UE 105 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1740. Sensor(s) 1740 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1780 capable of receiving signals 1784 from one or more GNSS satellites using an antenna 1782 (which could be the same as antenna 1732). Positioning based on GNSS signal measurement can be utilized to complement and/or incorporate the techniques described herein. The GNSS receiver 1780 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1780 is illustrated in FIG. 17 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1710, DSP 1720, and/or a processor within the wireless communication interface 1730 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1710 or DSP 1720.

The UE 105 may further include and/or be in communication with a memory 1760. The memory 1760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1760 of the UE 105 also can comprise software elements (not shown in FIG. 17), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1760 that are executable by the UE 105 (and/or processor(s) 1710 or DSP 1720 within UE 105). In some embodiments, then, such code and/or instructions can be used to configure and/or adapt a general-purpose computer (or other device) to perform one or more operations in accordance with the described methods.

FIG. 18 is a block diagram of an embodiment of a base station 120, which can be utilized as described herein above. It should be noted that FIG. 18 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1805 (or may otherwise be in communication, as appropriate). The hardware elements may include a processor(s) 1810 which can include without limitation one or more general-purpose processors, one or more special-purpose processors (such as DSP chips, graphics acceleration processors, ASICs, and/or the like), and/or other processing structure or means. As shown in FIG. 18, some embodiments may have a separate DSP 1820, depending on desired functionality. Location determination and/or other determinations based on wireless communication may be provided in the processor(s) 1810 and/or wireless communication interface 1830 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1830 may permit data and signaling to be communicated (e.g., transmitted and received) to UEs, other base stations/TRPs (e.g., eNBs, gNBs, and ng-cNBs), and/or other network components, computer systems, and/or any other electronic devices described herein. The communication can be carried out via one or more wireless communication antenna(s) 1832 that send and/or receive wireless signals 1834.

The base station 120 may also include a network interface 1880, which can include support of wireline communication technologies. The network interface 1880 may include a modem, network card, chipset, and/or the like. The network interface 1880 may include one or more input and/or output communication interfaces to permit data to be exchanged with a network, communication network servers, computer systems, and/or any other electronic devices described herein.

In many embodiments, the base station 120 may further comprise a memory 1860. The memory 1860 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1860 of the base station 120 also may comprise software elements (not shown in FIG. 18), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1860 that are executable by the base station 120 (and/or processor(s) 1810 or DSP 1820 within base station 120). In some embodiments, then, such code and/or instructions can be used to configure and/or adapt a general-purpose computer (or other device) to perform one or more operations in accordance with the described methods.

Figure 19:
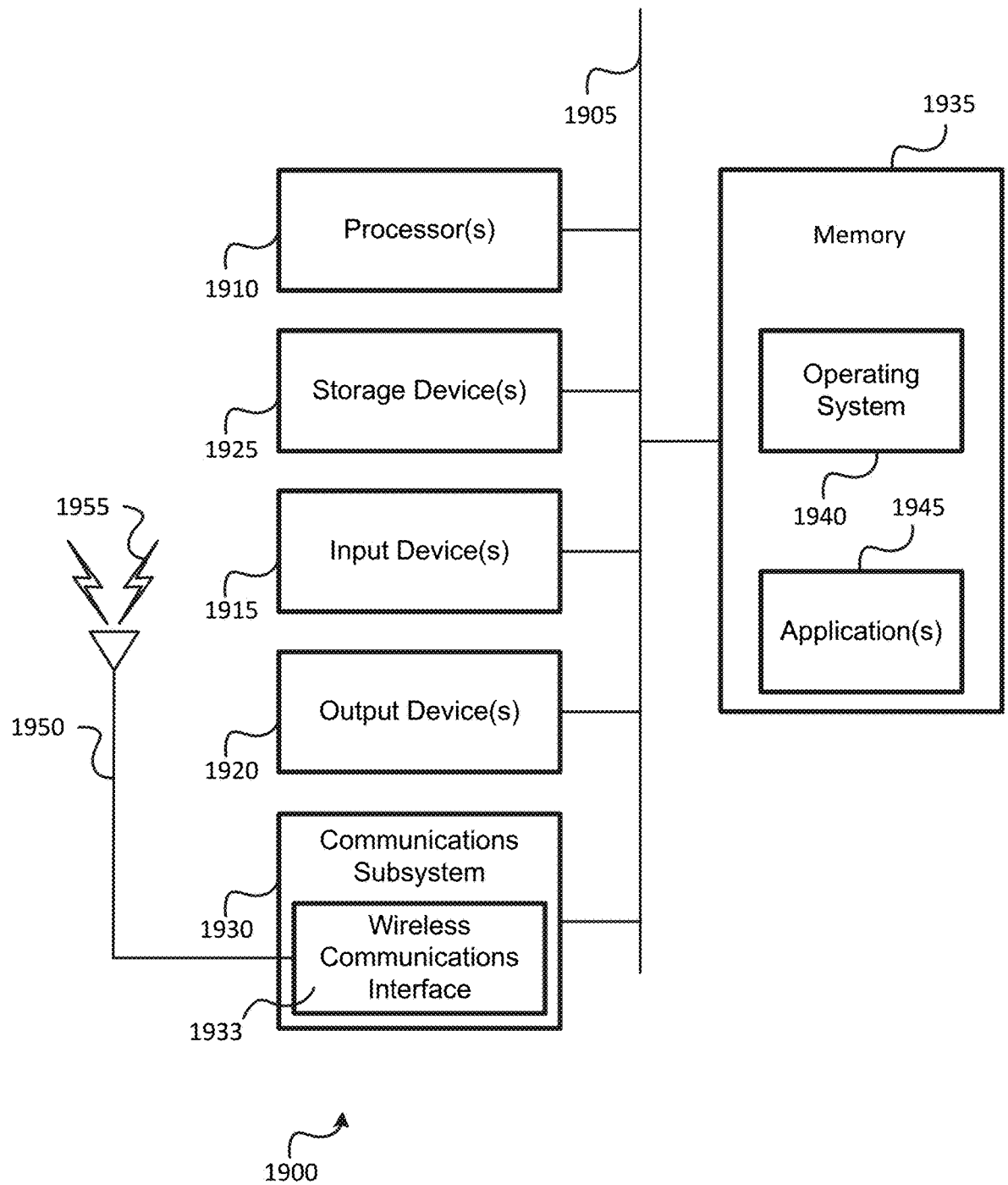
FIG. 19 is a block diagram of an embodiment of a computer system, which can be utilized in embodiments as described herein.

FIG. 19 is a block diagram of an embodiment of a computer system 1900, which may be used, in whole or in part, to provide the functions of one or more network components as described in the embodiments herein (e.g., location server 160 of FIG. 1, sensing server 906 of FIG. 9, etc.). It should be noted that FIG. 19 is meant only to provide a generalized illustration of various components, any or all of which may be utilized as appropriate. FIG. 19, therefore, broadly illustrates how individual system elements may be implemented in a relatively separated or relatively more integrated manner. In addition, it can be noted that components illustrated by FIG. 19 can be localized to a single device and/or distributed among various networked devices, which may be disposed at different geographical locations.

The computer system 1900 is shown comprising hardware elements that can be electrically coupled via a bus 1905 (or may otherwise be in communication, as appropriate). The hardware elements may include processor(s) 1910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1900 also may comprise one or more input devices 1915, which may comprise without limitation a mouse, a keyboard, a camera, a microphone, and/or the like; and one or more output devices 1920, which may comprise without limitation a display device, a printer, and/or the like.

The computer system 1900 may further include (and/or be in communication with) one or more non-transitory storage devices 1925, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1900 may also include a communications subsystem 1930, which may comprise wireless communication technologies managed and controlled by a wireless communication interface 1933, as well as wired technologies (such as Ethernet, coaxial communications, universal serial bus (USB), and the like). The wireless communication interface 1933 may comprise one or more wireless transceivers that may send and receive wireless signals 1955 (e.g., signals according to 5G NR or LTE) via wireless antenna(s) 1950. Thus the communications subsystem 1930 may comprise a modem, a network card (wireless or wired), an infrared communication device, a wireless communication device, and/or a chipset, and/or the like, which may enable the computer system 1900 to communicate on any or all of the communication networks described herein to any device on the respective network, including a User Equipment (UE), base stations and/or other TRPs, and/or any other electronic devices described herein. Hence, the communications subsystem 1930 may be used to receive and send data as described in the embodiments herein.

In many embodiments, the computer system 1900 will further comprise a working memory 1935, which may comprise a RAM or ROM device, as described above. Software elements, shown as being located within the working memory 1935, may comprise an operating system 1940, device drivers, executable libraries, and/or other code, such as one or more applications 1945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1925 described above. In some cases, the storage medium might be incorporated within a computer system, such as computer system 1900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1900 and/or might take the form of source and/or installable code, which, upon compilation and/or installation on the computer system 1900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed at a user equipment (UE) for supporting one or more radio frequency (RF) sensing measurements comprising:
- at the UE, receiving a reflected downlink signal, wherein the reflected downlink signal is transmitted as a downlink signal from a base station and reflected off of a target;
- at the UE, transmitting an uplink signal to be reflected off of the target and received by the base station as a reflected uplink signal;
- at the UE, determining a UE receive-transmit (RX-TX) time difference, the UE RX-TX time difference representing a difference between a time at which the reflected downlink signal is received by the UE and a time at which the uplink signal is transmitted by the UE; and
- at the UE, determining a UE measured frequency offset based on reception of the reflected downlink signal, the UE measured frequency offset comprising a Doppler shift component corresponding to a velocity of the target,
- wherein the UE RX-TX time difference and the UE measured frequency offset, along with a base station RX-TX time difference and a base station measured frequency offset, support computation of a position estimate and a velocity estimate for the target.

Clause 2. The method of clause 1, wherein the UE RX-TX time difference comprises (a) an receive (RX) group delay compensation term corresponding to propagation delay of the reflected downlink signal through RX circuitry at the UE and (b) a transmit (TX) group delay compensation term corresponding to propagation delay of the uplink signal through TX circuitry at the UE.

Clause 3. The method of clause 1 or 2, further comprising:
- at the UE, down-converting the reflected downlink signal using a local oscillator after receiving the reflected downlink signal; and
- at the UE, upconverting the uplink signal using the local oscillator before transmitting the uplink signal, wherein the UE measured frequency offset comprises no oscillator compensation term corresponding to any oscillator frequency error associated with the local oscillator.

Clause 4. The method of clause 1 or 2, further comprising:
at the UE, down-converting the reflected downlink signal using a RX local oscillator; and
at the UE, upconverting the uplink signal using a TX local oscillator,
wherein the UE measured frequency offset comprises a differential oscillator compensation term corresponding to a difference between a TX oscillator frequency error associated with the TX local oscillator and an RX oscillator frequency error associated with the RX local oscillator.

Clause 5. The method of any of clauses 1-4, wherein:
the receiving the reflected downlink signal, the transmitting the uplink signal, the determining the UE RX-TX time difference, and the determining the UE measured frequency offset are performed for each target in a plurality of targets, and
for each target in the plurality of targets, the UE RX-TX time difference and the UE measured frequency offset are associated with a target identifier corresponding to the target.

Clause 6. The method of clause 5, wherein:
for each target in the plurality of targets, the UE RX-TX time difference and the UE measured frequency offset are further associated with a time stamp.

Clause 7. The method of any of clauses 1-6, further comprising:
at the UE, reporting the UE RX-TX time difference and the UE measured frequency offset to a sensing server implemented as a part the base station, to support the computation of the position estimate and the velocity estimate for the target at the sensing server.

Clause 8. The method of any of clauses 1-6, further comprising:
at the UE, reporting the UE RX-TX time difference and the UE measured frequency offset to a sensing server implemented in a server apart from the base station, to support the computation of the position estimate and the velocity estimate for the target at the sensing server.

Clause 9. The method of any of clauses 1-8, wherein:
the UE is a mobile UE, and
the UE measured frequency offset further comprises an additional Doppler shift component corresponding to a velocity of the UE.

Clause 10. The method of any of clauses 1-9, wherein the downlink signal is transmitted over one or more downlink resources, and the uplink signal is transmitted over one or more uplink resources.

Clause 11. The method of clause 10, further comprising:
at the UE, identifying two or more downlink resources, from the one or more downlink resources, as resources over which the UE measured frequency offset is obtained; and
at the UE, reporting the two or more downlink resources, as resources over which the UE measured frequency offset is obtained, to a sensing server.

Clause 12. The method of clause 10 or 11, further comprising:
at the UE, identifying a downlink resource and an uplink resource, from the one or more downlink resources and the one or more uplink resources, as a pair of DL/UL resources over which the UE RX-TX time difference is obtained; and at the UE, reporting the downlink resource and the uplink resource, as the pair of DL/UL resources over which the UE RX-TX time difference is obtained, to a sensing server.

Clause 13. The method of clause 12, wherein the downlink resource is separated from the uplink resource by a time duration less than or equal to a specified maximum time gap parameter.

Clause 14. The method of any of clauses 10-13, further comprising:
at the UE, reporting a plurality of UE RX-TX time differences including the UE RX-TX time difference and one or more additional UE RX-TX time differences,
at the UE, for each UE RX-TX time difference in the plurality of UE RX-TX time differences, identifying a downlink resource and an uplink resource, from the one or more downlink resources and the one or more uplink resources, as a pair of DL/UL resources over which the UE RX-TX time difference is obtained, as part of reporting the UE RX-TX time difference.

Clause 15. The method of any of clauses 1-14, wherein the downlink signal and the uplink signal are transmitted at different times in a time-division duplexing (TDD) system, at different frequencies in a frequency-division duplexing (FDD) system, or at different times and/or frequencies in a time-based and frequency-based multiple access system.

Clause 16. The method of clause 15, wherein:
a sensing slot comprising at least one downlink sensing symbol and at least one uplink sensing symbol is defined in the time-based and frequency-based multiple access system,
the downlink signal is transmitted in the at least one downlink sensing symbol within the sensing slot, and
the uplink signal is transmitted in the at least one uplink sensing symbol within the sensing slot.

Clause 17. The method of clause 16, wherein the sensing slot further comprises a gap symbol between the downlink sensing symbol and the uplink sensing symbol.

Clause 18. A method performed at a base station for supporting one or more radio frequency (RF) sensing measurements comprising:
at base station, transmitting a downlink signal to be reflected off of a target and received by a user equipment (UE) as a reflected downlink signal;
at the base station, receiving a reflected uplink signal, wherein the reflected uplink signal is transmitted as an uplink signal from the UE and reflected off of the target;
at the base station, determining a base station receive-transmit (RX-TX) time difference, the base station RX-TX time difference representing a difference between a time at which the downlink signal is transmitted by the base station and a time at which the reflected uplink signal is received by the base station; and
at the base station, determining a base station measured frequency offset, the base station measured frequency offset comprising a Doppler shift component corresponding to a velocity of the target,
wherein the base station RX-TX time difference and the base station measured frequency offset, along with a UE RX-TX time difference and a UE measured frequency offset, support computation of a position estimate and a velocity estimate for the target.

Clause 19. A User Equipment (UE) for supporting one or more radio frequency (RF) sensing measurements comprising:
- at least one transceiver configured to receive a reflected downlink signal transmitted as a downlink signal from a base station and reflected off of a target, the at least one transceiver further configured to transmit an uplink signal to be reflected off of the target and received by the base station as a reflected uplink signal;
- a memory; and
- one or more processors coupled to the at least one transceiver and the memory, the one or more processors configured to determine a UE receive-transmit (RX-TX) time difference, the UE RX-TX time difference representing a difference between a time at which the reflected downlink signal is received by the UE and a time at which the uplink signal is transmitted by the UE, the one or more processors further configured to determine a UE measured frequency offset, the UE measured frequency offset comprising a Doppler shift component corresponding to a velocity of the target,
- wherein the UE RX-TX time difference and the UE measured frequency offset, along with a base station RX-TX time difference and a base station measured frequency offset, support computation of a position estimate and a velocity estimate for the target.

Clause 20. A non-transitory computer-readable medium having instructions embedded thereon, which, when executed by one or more processors, cause the one or more processors to perform functions comprising:
- at a user equipment (UE), receive a reflected downlink signal, wherein the reflected downlink signal is transmitted as a downlink signal from a base station and reflected off of a target;
- at the UE, transmit an uplink signal to be reflected off of the target and received by the base station as a reflected uplink signal;
- at the UE, determine a UE receive-transmit (RX-TX) time difference, the UE RX-TX time difference representing a difference between a time at which the reflected downlink signal is received by the UE and a time at which the uplink signal is transmitted by the UE; and
- at the UE, determine a UE measured frequency offset, the UE measured frequency offset comprising a Doppler shift component corresponding to a velocity of the target,
- wherein the UE RX-TX time difference and the UE measured frequency offset, along with a base station RX-TX time difference and a base station measured frequency offset, support computation of a position estimate and a velocity estimate for the target.

What is claimed is:

1. A method performed at a user equipment (UE) for supporting one or more radio frequency (RF) sensing measurements comprising:
   - at the UE, receiving a reflected downlink signal, wherein the reflected downlink signal is transmitted as a downlink signal from a base station and reflected off of a target;
   - at the UE, transmitting an uplink signal to be reflected off of the target and received by the base station as a reflected uplink signal;
   - at the UE, determining a UE receive-transmit (RX-TX) time difference, the UE RX-TX time difference representing a difference between a time at which the reflected downlink signal is received by the UE and a time at which the uplink signal is transmitted by the UE; and
   - at the UE, determining a UE measured frequency offset based on reception of the reflected downlink signal, the UE measured frequency offset comprising a Doppler shift component corresponding to a velocity of the target,
   - wherein the UE RX-TX time difference and the UE measured frequency offset, along with a base station RX-TX time difference and a base station measured frequency offset, support computation of a position estimate and a velocity estimate for the target.

2. The method of claim 1, wherein the UE RX-TX time difference comprises (a) an receive (RX) group delay compensation term corresponding to propagation delay of the reflected downlink signal through RX circuitry at the UE and (b) a transmit (TX) group delay compensation term corresponding to propagation delay of the uplink signal through TX circuitry at the UE.

3. The method of claim 1, further comprising:
   - at the UE, down-converting the reflected downlink signal using a local oscillator after receiving the reflected downlink signal; and
   - at the UE, upconverting the uplink signal using the local oscillator before transmitting the uplink signal,
   - wherein the UE measured frequency offset comprises no oscillator compensation term corresponding to any oscillator frequency error associated with the local oscillator.

4. The method of claim 1, further comprising:
   - at the UE, down-converting the reflected downlink signal using a RX local oscillator; and
   - at the UE, upconverting the uplink signal using a TX local oscillator,
   - wherein the UE measured frequency offset comprises a differential oscillator compensation term corresponding to a difference between a TX oscillator frequency error associated with the TX local oscillator and an RX oscillator frequency error associated with the RX local oscillator.

5. The method of claim 1, wherein:
   - the receiving the reflected downlink signal, the transmitting the uplink signal, the determining the UE RX-TX time difference, and the determining the UE measured frequency offset are performed for each target in a plurality of targets, and
   - for each target in the plurality of targets, the UE RX-TX time difference and the UE measured frequency offset are associated with a target identifier corresponding to the target.

6. The method of claim 5, wherein:
   - for each target in the plurality of targets, the UE RX-TX time difference and the UE measured frequency offset are further associated with a time stamp.

7. The method of claim 1, further comprising:
   - at the UE, reporting the UE RX-TX time difference and the UE measured frequency offset to a sensing server implemented as a part the base station, to support the computation of the position estimate and the velocity estimate for the target at the sensing server.

8. The method of claim 1, further comprising:
   - at the UE, reporting the UE RX-TX time difference and the UE measured frequency offset to a sensing server implemented in a server apart from the base station, to support the computation of the position estimate and the velocity estimate for the target at the sensing server.

9. The method of claim 1, wherein:
the UE is a mobile UE, and
the UE measured frequency offset further comprises an additional Doppler shift component corresponding to a velocity of the UE.

10. The method of claim 1, wherein the downlink signal is transmitted over one or more downlink resources, and the uplink signal is transmitted over one or more uplink resources.

11. The method of claim 10, further comprising:
at the UE, identifying two or more downlink resources, from the one or more downlink resources, as resources over which the UE measured frequency offset is obtained; and
at the UE, reporting the two or more downlink resources, as resources over which the UE measured frequency offset is obtained, to a sensing server.

12. The method of claim 10, further comprising:
at the UE, identifying a downlink resource and an uplink resource, from the one or more downlink resources and the one or more uplink resources, as a pair of DL/UL resources over which the UE RX-TX time difference is obtained; and
at the UE, reporting the downlink resource and the uplink resource, as the pair of DL/UL resources over which the UE RX-TX time difference is obtained, to a sensing server.

13. The method of claim 12, wherein the downlink resource is separated from the uplink resource by a time duration less than or equal to a specified maximum time gap parameter.

14. The method of claim 10, further comprising:
at the UE, reporting a plurality of UE RX-TX time differences including the UE RX-TX time difference and one or more additional UE RX-TX time differences,
at the UE, for each UE RX-TX time difference in the plurality of UE RX-TX time differences, identifying a downlink resource and an uplink resource, from the one or more downlink resources and the one or more uplink resources, as a pair of DL/UL resources over which the UE RX-TX time difference is obtained, as part of reporting the UE RX-TX time difference.

15. The method of claim 1, wherein the downlink signal and the uplink signal are transmitted at different times in a time-division duplexing (TDD) system, at different frequencies in a frequency-division duplexing (FDD) system, or at different times and/or frequencies in a time-based and frequency-based multiple access system.

16. The method of claim 15, wherein:
a sensing slot comprising at least one downlink sensing symbol and at least one uplink sensing symbol is defined in the time-based and frequency-based multiple access system,
the downlink signal is transmitted in the at least one downlink sensing symbol within the sensing slot, and
the uplink signal is transmitted in the at least one uplink sensing symbol within the sensing slot.

17. The method of claim 16, wherein the sensing slot further comprises a gap symbol between the downlink sensing symbol and the uplink sensing symbol.

18. A method performed at a base station for supporting one or more radio frequency (RF) sensing measurements comprising:
at base station, transmitting a downlink signal to be reflected off of a target and received by a user equipment (UE) as a reflected downlink signal;
at the base station, receiving a reflected uplink signal, wherein the reflected uplink signal is transmitted as an uplink signal from the UE and reflected off of the target;
at the base station, determining a base station receive-transmit (RX-TX) time difference, the base station RX-TX time difference representing a difference between a time at which the downlink signal is transmitted by the base station and a time at which the reflected uplink signal is received by the base station; and
at the base station, determining a base station measured frequency offset, the base station measured frequency offset comprising a Doppler shift component corresponding to a velocity of the target,
wherein the base station RX-TX time difference and the base station measured frequency offset, along with a UE RX-TX time difference and a UE measured frequency offset, support computation of a position estimate and a velocity estimate for the target.

19. A User Equipment (UE) for supporting one or more radio frequency (RF) sensing measurements comprising:
at least one transceiver configured to receive a reflected downlink signal transmitted as a downlink signal from a base station and reflected off of a target, the at least one transceiver further configured to transmit an uplink signal to be reflected off of the target and received by the base station as a reflected uplink signal;
a memory; and
one or more processors coupled to the at least one transceiver and the memory, the one or more processors configured to determine a UE receive-transmit (RX-TX) time difference, the UE RX-TX time difference representing a difference between a time at which the reflected downlink signal is received by the UE and a time at which the uplink signal is transmitted by the UE, the one or more processors further configured to determine a UE measured frequency offset, the UE measured frequency offset comprising a Doppler shift component corresponding to a velocity of the target,
wherein the UE RX-TX time difference and the UE measured frequency offset, along with a base station RX-TX time difference and a base station measured frequency offset, support computation of a position estimate and a velocity estimate for the target.

20. A non-transitory computer-readable medium having instructions embedded thereon, which, when executed by one or more processors, cause the one or more processors to perform functions comprising:
at a user equipment (UE), receive a reflected downlink signal, wherein the reflected downlink signal is transmitted as a downlink signal from a base station and reflected off of a target;
at the UE, transmit an uplink signal to be reflected off of the target and received by the base station as a reflected uplink signal;
at the UE, determine a UE receive-transmit (RX-TX) time difference, the UE RX-TX time difference representing a difference between a time at which the reflected downlink signal is received by the UE and a time at which the uplink signal is transmitted by the UE; and
at the UE, determine a UE measured frequency offset, the UE measured frequency offset comprising a Doppler shift component corresponding to a velocity of the target,
wherein the UE RX-TX time difference and the UE measured frequency offset, along with a base station RX-TX time difference and a base station measured frequency offset, support computation of a position estimate and a velocity estimate for the target.

\* \* \* \* \*